(12) United States Patent
Yang et al.

(10) Patent No.: US 10,505,334 B2
(45) Date of Patent: Dec. 10, 2019

(54) APPARATUS AND METHODS FOR GENERATING AND ENHANCING SMITH-PURCELL RADIATION

(71) Applicant: Massachusetts Institute of Technology, Cambridge, MA (US)

(72) Inventors: Yi Yang, Cambridge, MA (US); Aviram Massuda, Cambridge, MA (US); Charles Roques-Carmes, Cambridge, MA (US); Nicholas H. Rivera, Cambridge, MA (US); Tena Dubcek, Cambridge, MA (US); John D. Joannopoulos, Belmont, MA (US); Karl Kimon Berggren, Arlington, MA (US); Ido E. Kaminer, Cambridge, MA (US); Marin Soljacic, Belmont, MA (US); Yujia Yang, Jinzhong (CN); Steven E. Kooi, Lexington, MA (US); Phillip Donald Keathley, Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/944,360

(22) Filed: Apr. 3, 2018

(65) Prior Publication Data

US 2018/0287329 A1 Oct. 4, 2018

Related U.S. Application Data

(60) Provisional application No. 62/480,709, filed on Apr. 3, 2017.

(51) Int. Cl.
*H01J 23/06* (2006.01)
*H01S 3/09* (2006.01)
(Continued)

(52) U.S. Cl.
CPC .............. *H01S 3/0903* (2013.01); *H01J 9/02* (2013.01); *H01J 23/06* (2013.01); *H01S 3/08009* (2013.01)

(58) Field of Classification Search
CPC ...... H01J 2201/304; H01J 23/06; H01J 9/025; H01S 3/0903; H01S 2302/02; H01S 3/08009; H01S 3/0959; B82Y 20/00
(Continued)

(56) References Cited

U.S. PATENT DOCUMENTS

| | | | | |
|---|---|---|---|---|
| 5,319,322 A | * | 6/1994 | O'Loughlin | ............ H01J 25/00 331/81 |
| 6,909,104 B1 | * | 6/2005 | Koops | ..................... H01J 3/021 250/492.24 |

(Continued)

OTHER PUBLICATIONS

Adamo et al., "Light Well: A Tunable Free-Electron Light Source on a Chip," Phys. Rev. Lett. 103, 113901 (2009), 4 pages.
(Continued)

*Primary Examiner* — David A Vanore
(74) *Attorney, Agent, or Firm* — Smith Baluch LLP

(57) ABSTRACT

An apparatus for generating Smith-Purcell radiation having at least one spectral component at a wavelength $\lambda$ includes a periodic structure including a dielectric material and an electron source, in electromagnetic communication with the periodic structure, to emit an electron beam propagating within about $5\lambda$ from a surface of the periodic structure to induce emission of the Smith-Purcell radiation. The electron beam has an electron energy tunable between about 0.5 keV and about 40 keV so as to change a wavelength of the Smith-Purcell radiation.

27 Claims, 38 Drawing Sheets

(51) Int. Cl.
  *H01J 9/02* (2006.01)
  *H01S 3/08* (2006.01)

(58) Field of Classification Search
  USPC ..... 250/493.1, 504 R, 396 R, 494.1, 339.02,
    250/339.11, 341.1, 341.8, 397, 495.1,
    250/207, 336.1, 399, 492.23, 492.24,
    250/503.1; 315/500, 39.77, 39.51, 39.53,
    315/393.57, 505, 506, 5.38, 5.43; 372/10,
    372/12, 20, 21, 66, 73, 74
  See application file for complete search history.

(56) References Cited

U.S. PATENT DOCUMENTS

| | | | | |
|---|---|---|---|---|
| 7,436,177 | B2* | 10/2008 | Gorrell | G01N 23/225 315/39.51 |
| 7,450,794 | B2* | 11/2008 | Gorrell | G02B 6/12004 385/130 |
| 7,470,920 | B2* | 12/2008 | Gorrell | G09G 3/22 250/396 R |
| 7,473,914 | B2* | 1/2009 | Todd | H01J 25/00 250/493.1 |
| 7,492,868 | B2* | 2/2009 | Gorrell | H01J 25/00 315/500 |
| 7,557,647 | B2* | 7/2009 | Gorrell | H01J 25/00 250/336.1 |
| 7,560,716 | B2* | 7/2009 | Gorrell | H01J 25/00 250/493.1 |
| 7,573,045 | B2* | 8/2009 | Gorrell | B82Y 20/00 250/396 R |
| 7,579,609 | B2* | 8/2009 | Gorrell | B82Y 20/00 250/493.1 |
| 7,605,835 | B2* | 10/2009 | Gorrell | G03G 15/326 347/233 |
| 7,656,094 | B2* | 2/2010 | Gorrell | H05H 15/00 315/5.38 |
| 7,659,513 | B2* | 2/2010 | Gorrell | G01J 3/42 250/341.1 |
| 7,718,977 | B2* | 5/2010 | Gorrell | G01J 1/02 250/207 |
| 7,746,532 | B2* | 6/2010 | Gorrell | H01S 3/0903 315/500 |
| 7,835,499 | B2* | 11/2010 | Yu | H01J 25/02 378/119 |
| 7,876,793 | B2* | 1/2011 | Gorrell | H01J 25/00 372/2 |
| 8,228,959 | B2* | 7/2012 | Brownell | H01S 3/0903 372/10 |
| 8,837,551 | B2* | 9/2014 | Duan | H01J 25/00 372/20 |
| 8,958,444 | B2* | 2/2015 | Gardelle | H01S 3/0903 372/2 |
| 2006/0062258 | A1* | 3/2006 | Brau | H01S 3/0903 372/2 |
| 2010/0091370 | A1* | 4/2010 | Mahrt | G02B 5/1876 359/574 |
| 2012/0119183 | A1* | 5/2012 | Kharas | H01J 9/025 257/10 |
| 2012/0175521 | A1* | 7/2012 | Chawla | G01J 1/08 250/339.02 |
| 2013/0264500 | A1* | 10/2013 | Koops | H01J 25/68 250/504 R |
| 2016/0302294 | A1 | 10/2016 | Coleman et al. | |
| 2017/0324166 | A1* | 11/2017 | Wang | H01Q 9/0407 |
| 2018/0287329 | A1* | 10/2018 | Yang | H01S 3/0903 |

OTHER PUBLICATIONS

Adamo et al., "Electron-Beam-Driven Collective-Mode Metamaterial Light Source," Phys. Rev. Lett. 109, 217401 (2012), 5 pages.
Andrews et al., "Gain of a Smith-Purcell free-electron laser." Physical Review Special Topics—Accelerators and Beams 7.7 (2004): 070701, 7 pages.
Bar-Lev et al., "Plasmonic Metasurface for Efficient Ultrashort Pulse Laser-Driven Particle Acceleration," Phys. Rev. ST Accel. Beams 17, 121302 (2014), 7 pages.
Breuer et al., "Laser-Based Acceleration of Nonrelativistic Electrons at a Dielectric Structure," Phys. Rev. Lett. 111, 134803 (2013), 5 pages.
Cullis et al., "Visible light emission due to quantum size effects in highly porous crystalline silicon." Nature 353.6342 (1991): 335, 4 pages.
Dehlinger et al., "Intersubband electroluminescence from silicon-based quantum cascade structures." Science 290.5500 (2000): 2277-2280.
Friedman et al., "Spontaneous and Stimulated Emission from Quasifree Electrons," Rev. Mod. Phys. 60, 471 (1988), 65 pages.
Garcia De Abajo, "Optical excitations in electron microscopy," Reviews of Modern Physics, vol. 82, pp. 209-275, Feb. 2010.
Gover et al., "Angular Radiation Pattern of Smith-Purcell Radiation," JOSA B 1, 723 (1984), 6 pages.
Green et al. "Efficient silicon light-emitting diodes." Nature 412. 6849 (2001): 805, 4 pages.
Guerrera et al., "Nanofabrication of arrays of silicon field emitters with vertical silicon nanowire current limiters and self-aligned gates." Nanotechnology 27.29 (2016): 295302, 16 pages.
Guerrera et al., "Silicon Field Emitter Arrays With Current Densities Exceeding 100 A/cm2 at Gate Voltages Below 75V," IEEE Electron Device Letters, vol. 37, pp. 96-99, Jan. 2016.
Horiuchi et al., "Exotic Radiation from a Photonic Crystal Excited by an Ultrarelativistic Electron Beam," Phys. Rev. E 74, 056601 (2006), 4 pages.
Hsu et al.,. "Bound states in the continuum." Nature Reviews Materials 1.9 (2016): 16048, 44 pages.
Huang et al., Dirac cones induced by accidental degeneracy in photonic crystals and zero-refractive-index materials. Nature Mater. 10, 582-586 (2011).
Kapp et al., "Modification of a scanning electron microscope to produce Smith-Purcell radiation," Review of Scientific Instruments 75, 4732 (2004); https://doi.org/10.1063/1.1808894, 11 pages.
L. Lumerical Solutions Inc., FDTD Solutions accessed on Nov. 27, 2018 at "http://www.lumerical.com/tcad-products/fdtd/." 5 pages.
Lee et al., "Searching for a solid-state terahertz technology." Science 316.5821 (2007): 64-65.
Levy et al., "Characterization of LPCVD Aluminum for VLSI Processing," Journal of the Electrochemical Society, vol. 131, p. 2175, Sep. 1984.
Li et al., "Coherent radiation at the fundamental frequency by a Smith-Purcell free-electron laser with dielectric substrate," Appl. Phys. Lett. 110, 151108 (2017); doi: 10.1063/1.4980046 (published online Apr. 12, 2017), 5 pages.
Lin et al., "A three-dimensional photonic crystal operating at infrared wavelengths." Nature 394, No. 6690 (1998): 251-253.
Lombardo et al., "Room-temperature luminescence from Er-implanted semi-insulating polycrystalline silicon." Applied physics letters 63.14 (1993): 1942-1944.
McNeil et al., "X-ray free-electron lasers," Nature Photonics, vol. 4, pp. 814-821, Dec. 2010.
Miller et al., "Fundamental limits to optical response in absorptive systems." Optics Express 24.4 (2016): 3329-3364.
Mizuno et al., "Experimental Evidence of the Inverse Smith-Purcell Effect," Nature (London) 328, 45 (1987), 3 pages.
Mustonen et al., "High-density metallic nano-emitter arrays and their field emission characteristics," Nanotechnology, vol. 25, p. 085203, Feb. 2014, 7 pages.
Ng et al., "An efficient room-temperature silicon-based light-emitting diode." Nature 410.6825 (2001): 192, 4 pages.
Ohtaka, "Smith-Purcell radiation from metallic and dielectric photonic crystals." Lasers and Electro-Optics, 2001. CLEO/Pacific Rim 2001. The 4th Pacific Rim Conference on. vol. 1. IEEE, 2001, 2 pages.
Pavesi et al., "Optical gain in silicon nanocrystals." Nature 408. 6811 (2000): 440, 5 pages.

(56) References Cited

OTHER PUBLICATIONS

Peralta et al., "Demonstration of Electron Acceleration in a Laser-Driven Dielectric Microstructure," Nature (London) 503, 91 (2013), 11 pages.

Potylitsyn et al., "Diffraction Radiation from Relativistic Particles," Springer Tracts in Modern Physics, vol. 239, 2010, 285 pages.

Rong et al., "An all-silicon Raman laser." Nature 433.7023 (2005): 292, 3 pages.

Smith et al., "Visible light from localized surface charges moving across a grating," Physical Review, vol. 92, No. 4, p. 1069, 1953, 2 pages.

So et al., "Amplification of the Evanescent Field of Free Electrons," ACS Photonics 2, 1236 (2015), 5 pages.

Takeda et al., "Laser Linac with Grating," Nucl. Instrum. Methods 62, 306 (1968), 5 pages.

Tang et al., "Emission measurements and simulation of silicon field emitter arrays with linear planar lenses," Journal of Vacuum Science & Technology B: Microelectronics and Nanometer Structures, vol. 14, p. 3455, Nov. 1996, 6 pages.

Tantiwanichapan et al., "Graphene on Nanoscale Gratings for the Generation of Terahertz Smith-Purcell Radiation," Appl. Phys. Lett. 105, 241102 (2014), 5 pages.

Temple, "Recent progress in field emitter array development for high performance applications," Materials Science and Engineering: R: Reports, vol. 24, pp. 185-239, Jan. 1999.

Tsujino et al., "Field-Emission Characteristics of Molded Molybdenum Nanotip Arrays With Stacked Collimation Gate Electrodes," IEEE Electron Device Letters, vol. 31, pp. 1059-1061, Sep. 2010.

Van Den Berg, "Smith-Purcell Radiation from a Point Charge Moving Parallel to a Reflection Grating," J. Opt. Soc. Am. 63, 1588 (1973), 10 pages.

Wang et al., "An silicon nanocrystal laser," ariXiv, Sep. 30, 2017, 19 pp., https://arxiv.org/abs/1710.00215.

Yamaguti et al., "Photonic Crystals Versus Diffraction Gratings in Smith-Purcell Radiation," Phys. Rev. B 66, 195202 (2002), 12 pages.

Yamamoto et al., "Interference of Surface Plasmons and Smith-Purcell Emission Probed by Angle-Resolved Cathodoluminescence Spectroscopy," Phys. Rev. B 91, 125144 (2015), 7 pages.

Yang et al., "Maximal Photon Emission and Energy Loss from Free Electrons." Rev.(nd) (2017), 7 pages.

Zhang et al., "Enhancement of Coherent Smith-Purcell Radiation at Terahertz Frequency by Optimized Grating, Prebunched-Beams, and Open Cavity," Phys. Rev. ST Accel. Beams 18, 020702 (2015), 13 pages.

Zhen et al., "Spawning rings of exceptional points out of Dirac cones." Nature 525.7569 (2015): 354-358.

Bower et al., "On-chip vacuum microtriode using carbon nanotube field emitters." Applied physics letters 80.20 (2002): 3820-3822. 3 pages.

Bratman et al., "To the problem of single-mode operation in Smith-Purcell FEM." International journal of infrared and millimeter waves 20.6 (1999): 991-1007. 4 pages.

International Search Report and Written Opinion in International Patent Application No. PCT/US2018/025898 dated Jan. 28, 2019, 10 pages.

Jarvis, Development of high-brightness electron sources for free-electron lasers. PhD dissertation. Vanderbilt University, 2009. 9 pages.

Kaminer et al. "Spectrally and spatially resolved Smith-Purcell radiation in plasmonic crystals with short-range disorder." Physical Review X 7.1 (2017): 011003. 11 pages.

Prokop, et al. "Numerical modeling of a table-top tunable Smith-Purcell terahertz free-electron laser operating in the super-radiant regime." Applied Physics Letters 96.15 (2010): 151502. 5 pages.

Tsesses et al., "Light generation via quantum interaction of electrons with periodic nanostructures." Physical Review A 95.1 (2017): 013832. 8 pages.

\* cited by examiner

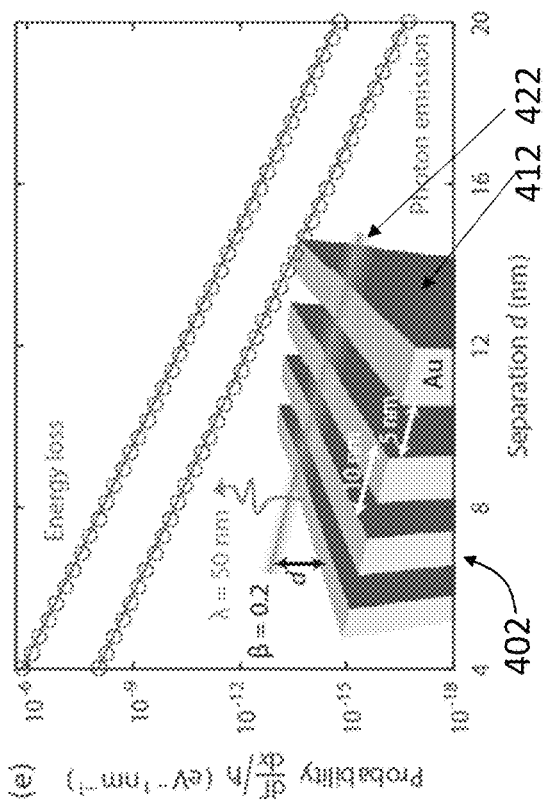
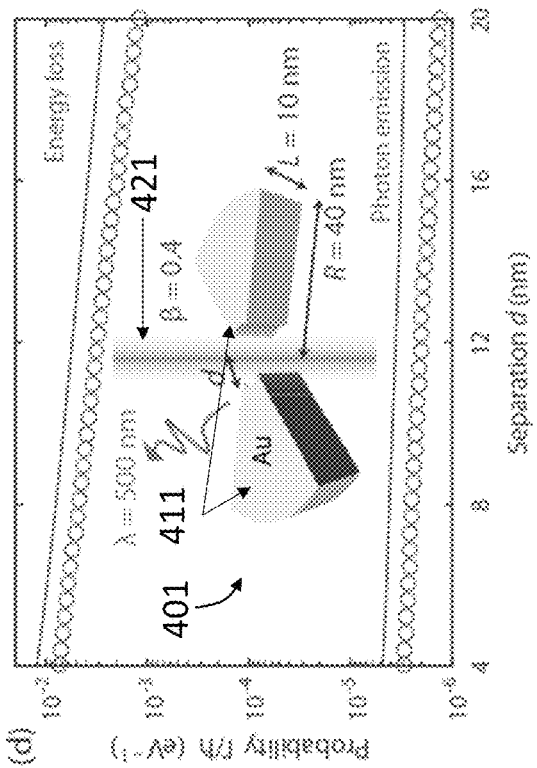
FIG. 4B
FIG. 4A

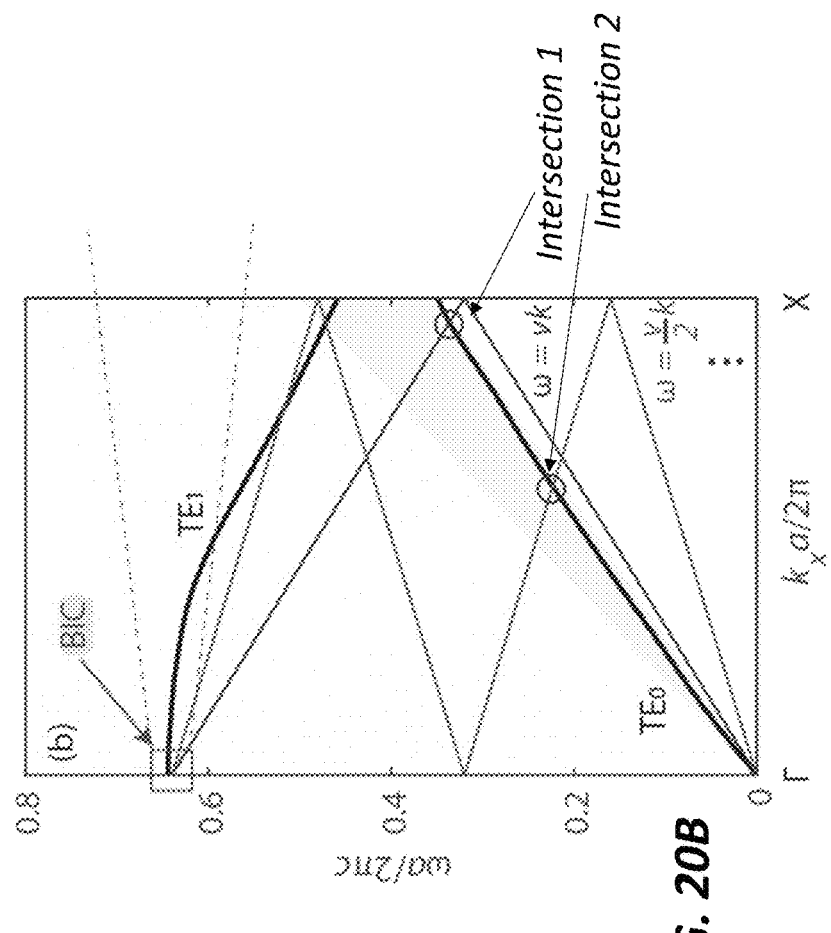
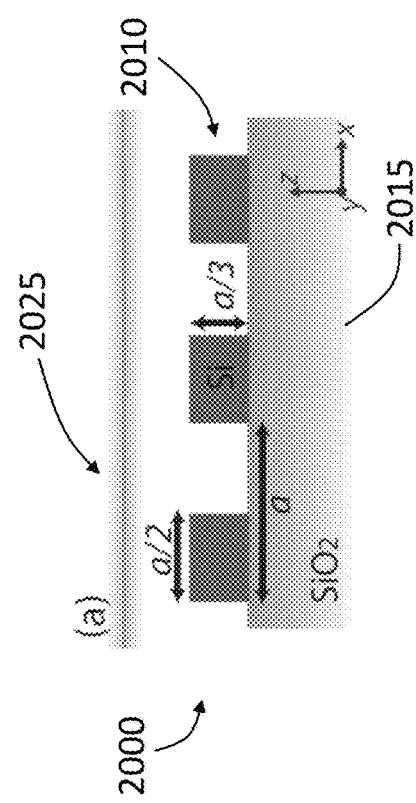
FIG. 20A
FIG. 20B

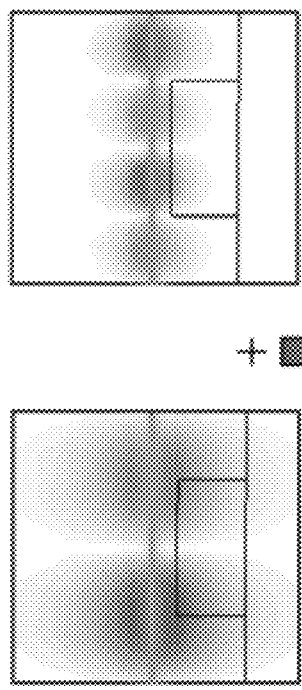
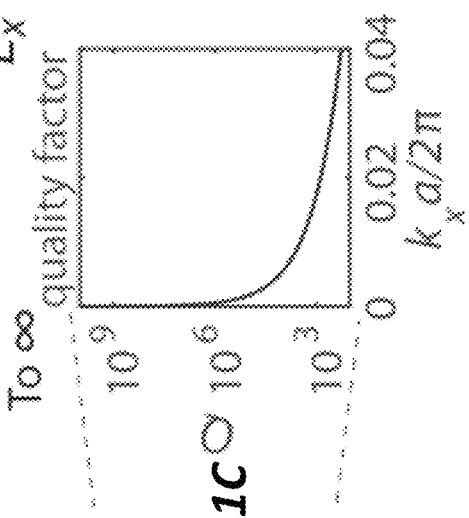
FIG. 21A
FIG. 21B
FIG. 21C
FIG. 21D

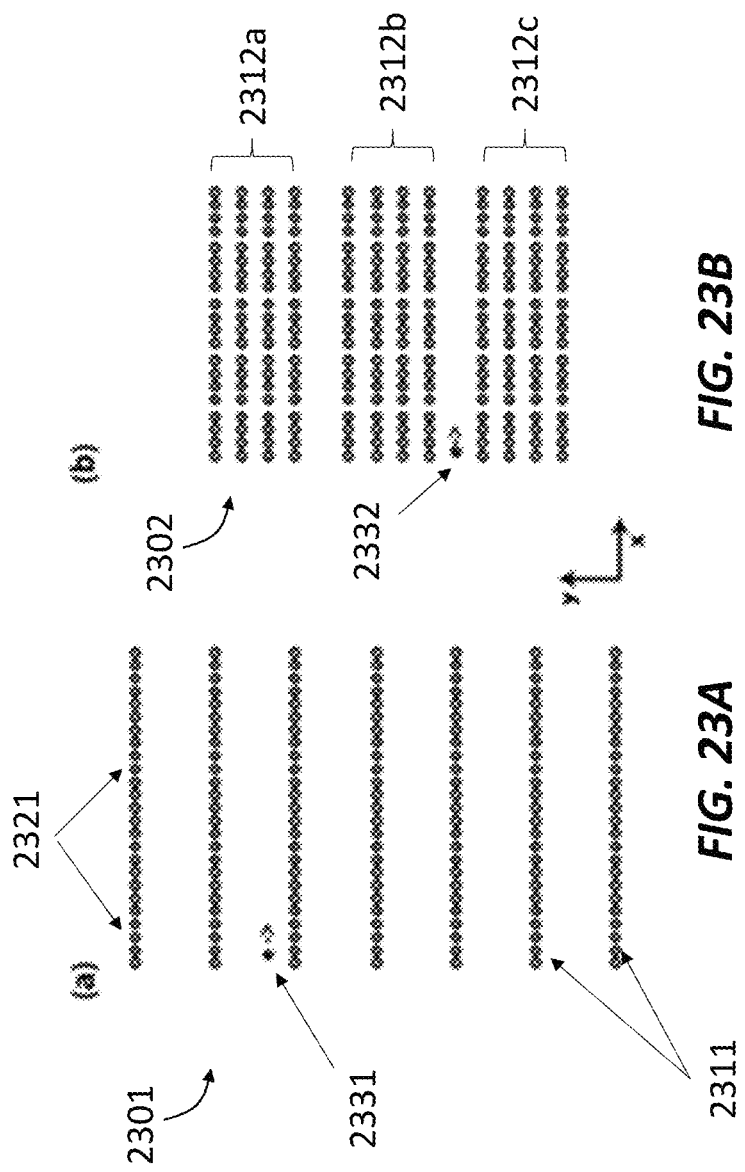

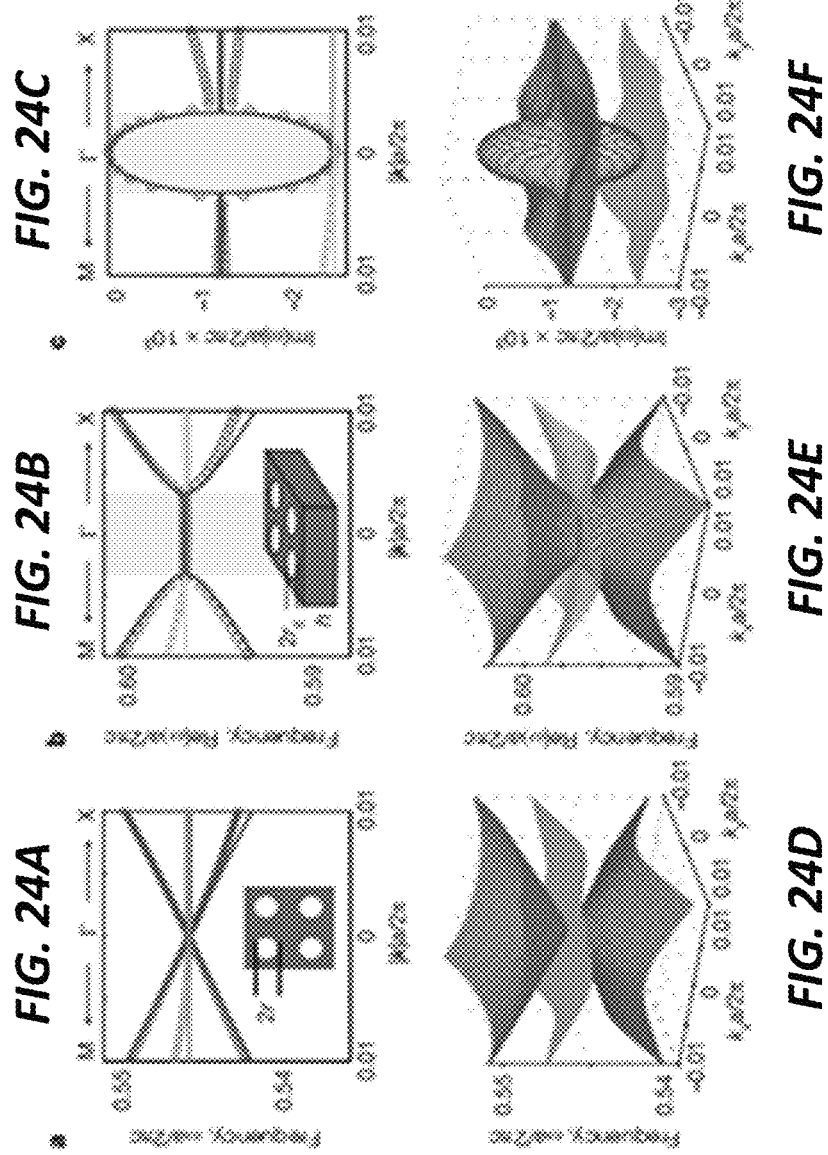

| Source | Wavelength | Bandwidth | Output power | Tunable | Applications |
|---|---|---|---|---|---|
| Deep UV LED [8] | 275-285nm | ≈15nm | 60mW | No | Small volumes disinfection |
| Hg lamp | 253.7nm | ≈5nm | 1W to 100W | No | Large volumes disinfection |
| Plasma sources [9] | 13.5nm | ≈0.3nm | 50W | No | EUV lithography |
| Super continuum lasers | 270-480nm | ≈2-12nm | 2-80μW | Yes | Table-top tunable sources |
| SP source | fully tunable down to ≈10nm | Tunable with optimized geometries | > pW (in our proof-of-concept – can be easily increased) | Yes | |

FIG. 31

APPARATUS AND METHODS FOR GENERATING AND ENHANCING SMITH-PURCELL RADIATION

CROSS-REFERENCE TO RELATED APPLICATIONS

This application claims the priority benefit under 35 U.S.C. § 119(e) of U.S. Application No. 62/480,709, filed Apr. 3, 2017, and entitled "EFFICIENT SMITH-PURCELL RADIATION SOURCES AND ENHANCEMENT METHODS," which is hereby incorporated herein by reference in its entirety.

GOVERNMENT SUPPORT

This invention was made with Government support under Grant No. W911NF-13-D-0001 awarded by the Army Research Office. The Government has certain rights in the invention.

BACKGROUND

The Smith-Purcell effect describes light emission (also referred to as Smith-Purcell radiation) from collective excitation that is induced by a free electron when the free electron couples, through its near field, to the electromagnetic modes of a periodic structure. The wavelength of the Smith-Purcell radiation usually depends on the velocity of the electron and the geometry of the periodic structure. Therefore, the Smith-Purcell radiation can be used to construct light sources that can be wavelength tunable via the adjustment of the electron velocity. Conventional systems utilizing the Smith-Purcell effect usually use metallic periodic structure due to the image charge intuition available in metal.

However, output from existing light sources based on the Smith-Purcell effect is usually too weak to be used for realistic applications. This may be attributed to several reasons. First, it is usually challenging to address the phase mismatch between the electrons with the emitted photons because the speed of electrons can hardly reach the speed of light. Second, the intensity of the Smith-Purcell radiation usually benefits from a short distance between the electrons and the periodic structure, but precise alignment tends to be difficult especially on nanoscale. Third, spontaneous Smith-Purcell radiation contains a wide range of frequency components, and each component typically radiates into a different direction. It remains a challenge to generate Smith-Purcell radiation that is more monochromatic and more directional.

SUMMARY

Embodiments of the present technology generally relate to generation and enhancement of Smith-Purcell radiation. In one example, an apparatus for generating Smith-Purcell radiation having at least one spectral component at a wavelength $\lambda$ includes a periodic structure comprising a dielectric material and an electron source, in electromagnetic communication with the periodic structure, to emit an electron beam propagating within about $5\lambda$ from a surface of the periodic structure to induce emission of the Smith-Purcell radiation. The electron beam has an electron energy tunable between about 0.5 keV and about 40 keV so as to change a wavelength of the Smith-Purcell radiation.

In another example, a method for generating Smith-Purcell radiation having at least one spectral component at a wavelength $\lambda$ includes emitting an electron beam to propagate within about $5\lambda$ from a surface of a periodic structure comprising a dielectric material. The electron beam induces emission of the Smith-Purcell radiation. The method also includes changing an electron energy of the electron beam between about 0.5 keV and about 40 keV to change a wavelength of the Smith-Purcell radiation.

In yet another example, a tunable light source includes a periodic structure comprising a dielectric material and fabricated in a semiconductor substrate. The periodic structure defines at least one bound state in the continuum (BIC) at a bound state wavelength $\lambda_B$. The tunable light source also includes a gated field emitter array (FEA) fabricated in the semiconductor substrate and configured to emit an electron beam to propagate within about 50 nm from a surface of the periodic structure to induce Smith-Purcell radiation. The electron beam has an electron velocity v between about $0.9 \times ac/(m\lambda_B)$ and $1.1 \times ac/(m\lambda_B)$, where a is a period of the periodic structure, c is a speed of light, and m is a positive integer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A and 4B show numerical simulations of Smith-Purcell emission induced by an electron traversing the center of an annular bowtie antenna and a grating, respectively.

FIG. 20A shows a schematic of a silicon-on-insulator grating to illustrate the narrow-band enhancement of Smith-Purcell radiation via high-Q resonance near a photonic bound state in the continuum (BIC).

FIG. 20B shows calculated TE band structure in the Γ-X direction of the grating shown in FIG. 20A.

FIGS. 21A and 21B show calculated incident field of electrons at velocities $\beta=a/\lambda_B$ and $\beta=a/2\lambda_B$, respectively, in the grating shown in FIG. 20A, where a is the period of the grating and $\lambda_B$ is the wavelength of at least one BIC defined by the grating.

FIGS. 21C and 21D show calculated resonant quality factor and eigenmode profile near a BIC, respectively, in the grating shown in FIG. 20A.

FIGS. 23A and 23B show schematics of two grating supercells for narrow-band enhancement of Smith-Purcell radiation.

FIGS. 24A-24F illustrate construction of Dirac cones in photonic crystals that can be used for broadband enhancement of Smith-Purcell radiation.

FIG. 31 shows a table comparing existing UV/EUV light sources with Smith-Purcell light sources.

DETAILED DESCRIPTION

Overview

Apparatus and methods described herein employ several techniques to address the challenges in conventional radiation sources based on the Smith-Purcell effect. An analytical framework is established to calculate the output intensity from Smith-Purcell radiation so as to provide guidance for constructing light sources. In one technique, a Smith-Purcell light source includes a dielectric periodic structure (e.g., silicon) to generate output radiation in the visible and near infrared regime. In another technique, Smith-Purcell radiation is significantly enhanced within a given spectral region (i.e., narrowband enhancement) using high-Q resonances near bound states in the continuum (BIC). Broadband enhancement is achieved using Dirac-like dispersion embedded in the continuum. Rate equations for the stimulated process of Smith-Purcell free electron lasers and two-photon lasers are also provided. Gain and threshold current can be estimated from these equations. These techniques can be used either separately or in combination with another.

Analytical Framework of Smith-Purcell Effect

The Smith-Purcell effect epitomizes the potential of free electron radiation. Consider an electron at velocity $\beta=v/c$ traversing a structure with periodicity a. The free electron can generate far-field radiation at wavelength λ and polar angle θ:

$$\lambda = \frac{a}{m}\left(\frac{1}{\beta} - \cos\theta\right) \quad (1)$$

where m is the integer diffraction order. Equation (1) does not include a minimum velocity or a threshold velocity to trigger the Smith-Purcell emission. Therefore, the Smith-Purcell effect offers promising prospects to construct threshold-free and spectrally tunable light sources, spanning from microwave and Terahertz, across visible, and towards X-ray frequencies.

Despite the simple momentum-conservation determination of wavelength $\lambda$ and angle $\theta$ as shown in Equation (1), there is no unified yet simple analytical equation for the radiation intensity. Previous theories typically only offer explicit solutions either under strong assumptions (e.g., assuming perfect conductors or employing effective medium descriptions) or for simple, symmetric geometries. Consequently, heavily numerical strategies are often relied on to calculate the output intensity of Smith-Purcell radiation. The complexity of the interactions between electrons and photonic media remains a challenge towards a general understanding of the Smith-Purcell effect for arbitrary structures and consequently, construction of efficient free-electron light-emitting devices.

Figure 1:
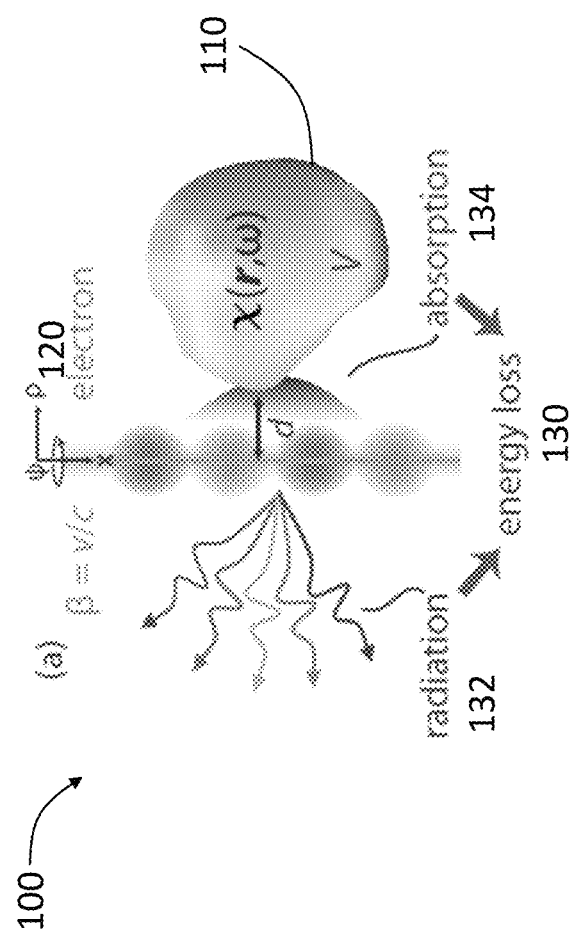
FIG. 1 shows an interaction between a free electron and an obstacle to construct an analytical framework of Smith-Purcell radiation.

FIG. 1 shows a schematic of a system 100 illustrating the interaction between a free electron 120 and an obstacle 110 to construct an analytical framework of Smith-Purcell radiation. The obstacle 110 is characterized by a susceptibility tensor $\chi(r, \omega)$ within a volume V and located at a distance d from the free electron 120. The interaction generates electron energy loss 130 contributed by radiation loss 132 and absorption loss 134. The analysis begins by considering an electron having a charge –e and propagating at a constant velocity $v\hat{x}$ traversing the obstacle 110 (also referred to as a scatterer). The obstacle 110 can be plasmonic or dielectric, finite or extended, and can have an arbitrary size and material composition. The free current density of the electron 120, defined as $J(r, t) = -\hat{x}ev\delta(y)\delta(z)\delta(x-vt)$, generates a frequency-dependent ($e^{i\omega t}$ convention) incident field.

$$E_{inc}(r, \omega) = \frac{e\kappa_p e^{ik_v x}}{2\pi\omega\varepsilon_0}[\hat{x}ik_p K_0(k_p\rho) - \hat{\rho}\kappa_v K_1(k_p\rho)] \quad (2)$$

Equation (2) is written in cylindrical coordinates $(x, \rho, \psi)$. $K_n$ is the modified Bessel function of the second kind, $k_v = \omega/v$, $\kappa_p = \sqrt{k_v^2 - k^2} = k/\beta\gamma$, $k = \omega/c$ is the free space wave vector, and $\gamma = 1/\sqrt{1-\beta^2}$ is the Lorentz factor.

The photon emission and energy loss of free electrons can be treated as a scattering problem: the electromagnetic fields $F_{inc} = (E_{inc}, Z_0 H_{inc})^T$ (for free-space impedance $Z_0$) are incident upon a photonic medium with material susceptibility $\chi$ (i.e., a 6×6 tensor for a general medium), causing both absorption 134 and far-field scattering 132 (i.e., photon emission) that together comprise electron energy loss 130.

For a generic electromagnetic scattering problem, passivity (i.e., the condition that polarization currents do zero net work) usually constrains the maximum optical response from a given incident field. Three power quantities can be derived from $F_{inc}$ and the total field F within the volume V. The first quantity is the total power lost by the electron:

$$P_{loss} = -(\tfrac{1}{2})Re\int_V J^* \cdot E dV = (\varepsilon_0\omega/2)Im\int_V F_{inc}^+ \chi F dV \quad (3)$$

The second quantity is the power absorbed by the medium:

$$P_{abs} = (\varepsilon_0\omega/2)Im\int_V F^+ \chi F dV \quad (4)$$

and the third quantity is the difference between $P_{loss}$ and $P_{abs}$, i.e., the power radiated to the far field, $P_{rad} = P_{loss} - P_{abs}$.

The total loss $P_{loss}$ can be a linear function of F (if F is treated as an independent variable, t), whereas the fraction that is dissipated can be a quadratic function of F. Passivity is usually associated with nonnegative radiated power, represented by the inequality $P_{abs} < P_{loss}$. In this framework, this inequality is a convex constraint on the response function. Constrained maximization of the energy-loss and photon-emission power quantities, $P_{loss}$ and $P_{rad}$, directly yields the limits:

$$P_\tau(\omega) \leq \left(\frac{\varepsilon_0\omega\xi_\tau}{2}\right)\int_V F_{inc}^+ \chi^+ (Im\chi)^{-1} \chi F_{inc} dV \quad (5)$$

where $\tau \in \{rad, loss\}$ and $\xi_\tau$ accounts for a variable radiative efficiency $\eta$ (defined as the ratio of radiative energy loss to total energy loss): $\xi_{loss} = 1$ and $\xi_{rad} = \eta(1-\eta) \leq \tfrac{1}{4}$. The following analysis considers isotropic and nonmagnetic materials (and thus a scalar susceptibility $\chi$), but the generalizations to anisotropic and/or magnetic media are straightforward.

Combining Equations (2) and (5) yields a general limit on the loss or emission spectral probabilities $\Gamma_\tau(\omega) = P_\tau(\omega)/\hbar\omega$:

$$\Gamma_\tau(\omega) \leq \left(\frac{\alpha\xi_\tau c}{2\pi\omega^2}\right)\int_V \frac{|\chi|^2}{Im\chi}[\kappa_p^4 K_0^2(k_p\rho) + \kappa_p^2\kappa_v^2 K_1^2(k_p\rho)]dV \quad (6)$$

where $\alpha$ is the fine-structure constant. Equation (6) shows, without solving Maxwell's equations, a maximum rate of photon generation based on the electron velocity $\beta$ (through $k_v$ and $\kappa_p$), the material composition $\chi(r)$, and the volume V.

The limit in Equation (6) can be further simplified by removing the shape dependence of V, since the integrand is positive and is thus bounded above by the same integral for any enclosing structure. A scatterer separated from the electron by a minimum distance d can be enclosed within a larger concentric hollow cylinder sector having an inner radius d and an outer radius $\infty$. For such a sector (height L and opening azimuthal angle $\psi \in [0, 2\pi]$), Equation (6) can be further simplified, leading to a general closed-form shape-independent limit that highlights the role of the impact parameter $\kappa_p d$:

$$\Gamma_\tau(\omega) \leq \left(\frac{\alpha\xi_\tau}{2\pi c}\right)\frac{|\chi|^2}{Im\chi}[(k_p d)K_0(k_p d)k_1(k_p d)] \quad (7a)$$

$$\propto \frac{1}{\beta^2}\begin{cases} \ln\left(\frac{1}{k_p d}\right), & \text{for } k_p d \ll 1, \\ \frac{\pi e^{-2k_p d}}{2}, & \text{for } k_p d \gg 1, \end{cases} \quad (7b)$$

The limits of Equations (6), (7a) and (7b) are completely general. They set the maximum photon emission and energy loss of an electron beam coupled to an arbitrary photonic environment in either the non-retarded or retarded regimes, given only the beam properties and material composition. Several factors can determine maximal radiation from the interaction illustrated in FIG. 1, including the intrinsic material loss (represented by $Im\chi$), electron velocity $\beta$, and impact parameter $\kappa_p d$. The metric $|\chi|^2/Im\chi$ can be used as a figure of merit (FOM) that reflects the influence of the material choice, which depends sensitively on the radiation wavelength. The electron velocity β also appears implicitly in the impact parameter $\kappa_\rho d = kd/\beta\gamma$, showing that the relevant length scale is set by the relativistic velocity of the electron. The impact parameter $\kappa_\rho d$ reflects the influence of the Lorentz contraction $d/\gamma$.

Figure 2:
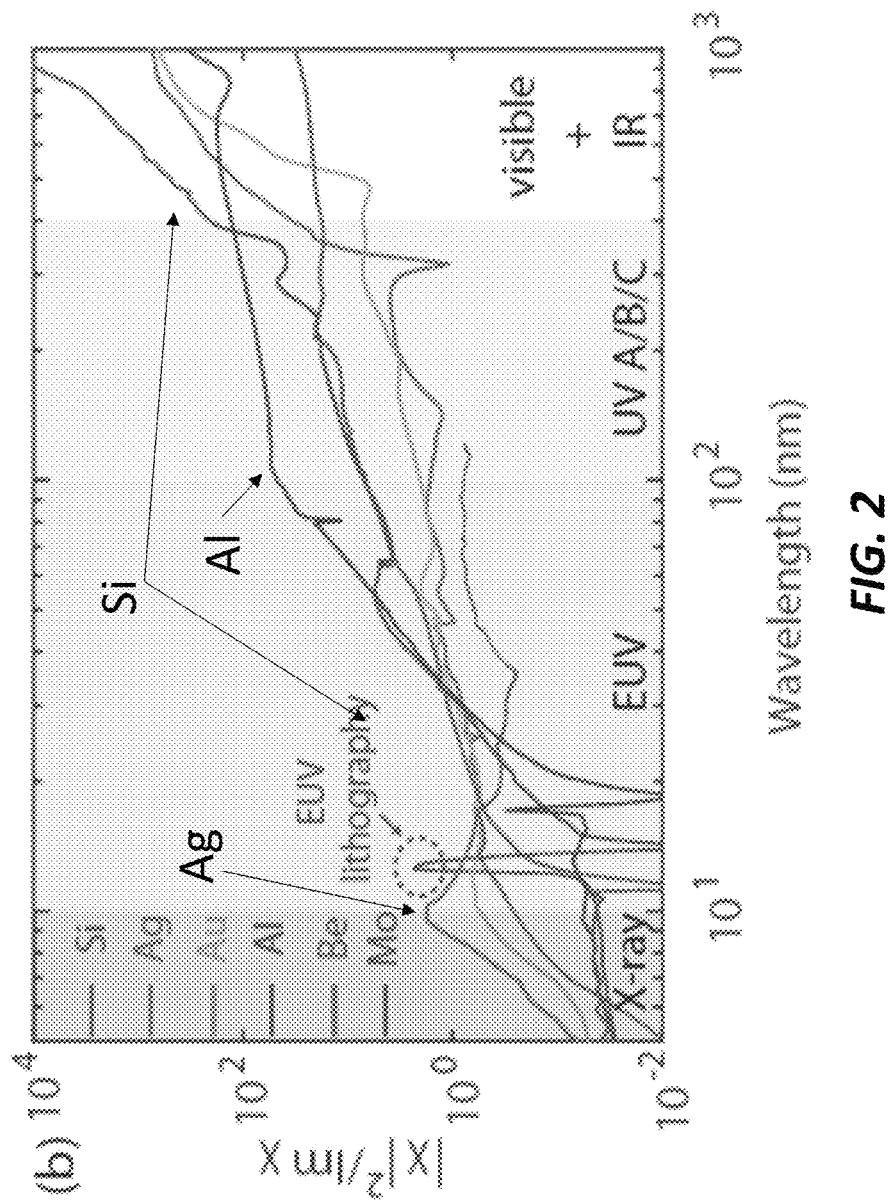
FIG. 2 shows $|\chi|^2/\text{Im}\chi$ of several representative materials to illustrate the maximum material response to the optical excitations of free electrons over different spectral ranges, where $\chi$ is the susceptibility of a material.

FIG. 2 shows $|\chi|^2/\mathrm{Im}\chi$ of several representative materials to illustrate the maximum material response to the optical excitations of free electrons over different spectral ranges, where χ is the susceptibility of a material. In the X-ray and extreme ultra-violet (EUV) regime, silicon has a peak material response near 13.5 nm (dashed circle), which is widely used in EUV lithography. In addition to silicon, silver can also be a promising candidate. In the UV-A/B/C bands, aluminum has the largest FOM. Silicon also shows greater $|\chi|^2/\mathrm{Im}\chi$ in the visible and near infrared regime. Therefore, contrary to the image charge intuition for the optical excitations of electrons, low-loss dielectrics (e.g., Si in the visible and infrared regimes) can be superior to metals with regard to Smith-Purcell radiation.

Figure 3:
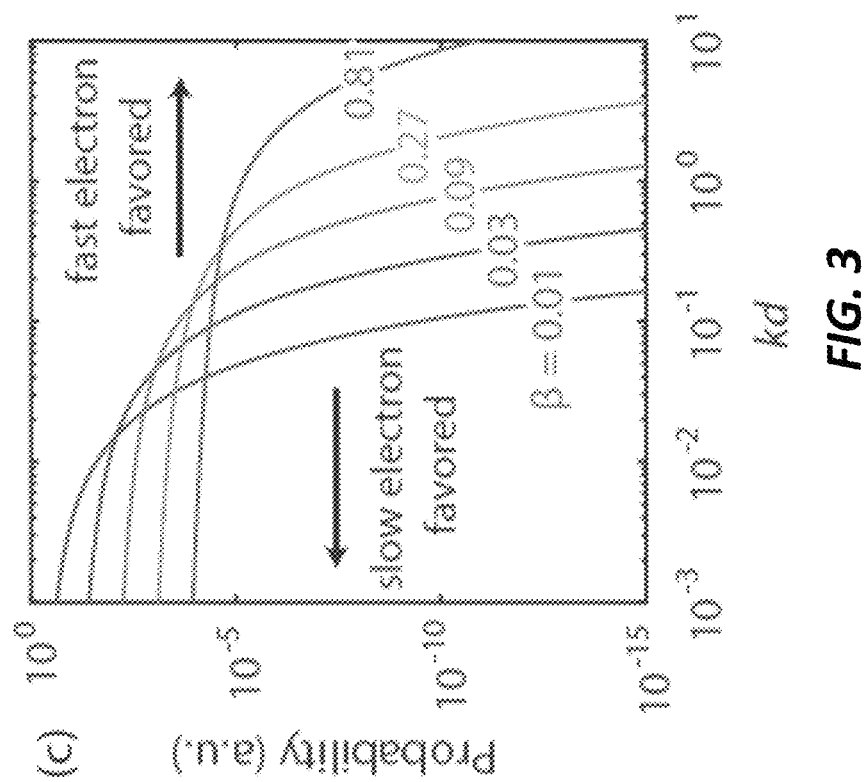
FIG. 3 shows emission probability in the interaction shown in FIG. 1 as a function of the distance between the electron and the periodic structure at different electron velocities.

FIG. 3 shows emission probability in the system 100 shown in FIG. 1 as a function of the distance between the electron and the periodic structure at different electron velocities. Equations (6), (7a), and (7b) can also be used to configure the electron source in a Smith-Purcell light source to emit electron beams having the optimal electron velocities. As shown in FIG. 3, when electrons are in the far field of the structure ($\kappa_\rho d \gg 1$), stronger photon emission and energy loss are achieved by faster electrons. On the contrary, if electrons are in the near field ($\kappa_\rho d \ll 1$), slower electrons can generate stronger emission. This contrasting behavior can be seen from the asymptotic behavior of Equation (7b), where the $1/\beta^2$ or $e^{-2\kappa_\rho d}$ dependence is dominant at short and large separations, respectively. Physically, the optimal velocities depend on the incident-field properties (see, Equation (2)): slow electrons can generate stronger near field amplitudes although they can be more evanescent. FIG. 3 also shows that, in applications using low-energy electrons for Cherenkov and Smith-Purcell radiation, the emission can be enhanced at subwavelength interaction distances.

FIGS. 4A and 4B show numerical simulations of Smith-Purcell emission induced by an electron traversing the center of an annular bowtie antenna and a grating, respectively. The numerical results (shown in circles) are compared with analytical results (shown in solid curves) derived from Equations (6), (7a), and (7b). FIG. 4A shows a system 401 including an electron 421 traversing the center of an annular Au bowtie antenna 411. The electron 421 undergoes antenna-enabled transition radiation (η is about 0.07%). FIG. 4B shows a system 402 including an electron 422 traversing a periodic Au grating 412, undergoing Smith-Purcell radiation (η is about 0.9%). In both cases, the numerical results closely trail the upper limit at the considered wavelengths derived from Equations (6), (7a) and (7b), demonstrating that the limits can be approached or even attained with modest effort.

The system 402 shown in FIG. 4B can be a practical setup to construct light sources based on Smith-Purcell radiation. Aside from the shape-independent limit (see Equations (7a) and (7b)), a sharper limit (in per unit length for periodic structure) can also be identified specifically for Smith-Purcell radiation using rectangular gratings having a filling factor Λ:

$$\frac{d\Gamma_\tau(\omega)}{dx} \le \left(\frac{\alpha\xi_\tau}{2\pi c}\right) \frac{|\chi|^2}{\mathrm{Im}\chi} \Lambda \mathcal{G}(\beta, kd) \tag{8}$$

The function $\mathcal{G}(\beta, kd)$ is an azimuthal integral over the Meijer G-function $G_{1,3}^{3,0}$ that arises in the radial integration of the modified Bessel functions $K_n$. Equation (8) can be viewed as a specific case of Equation (6) for grating structures without any approximations and thus can be readily generalized to multi-material scenarios.

Figure 5A:
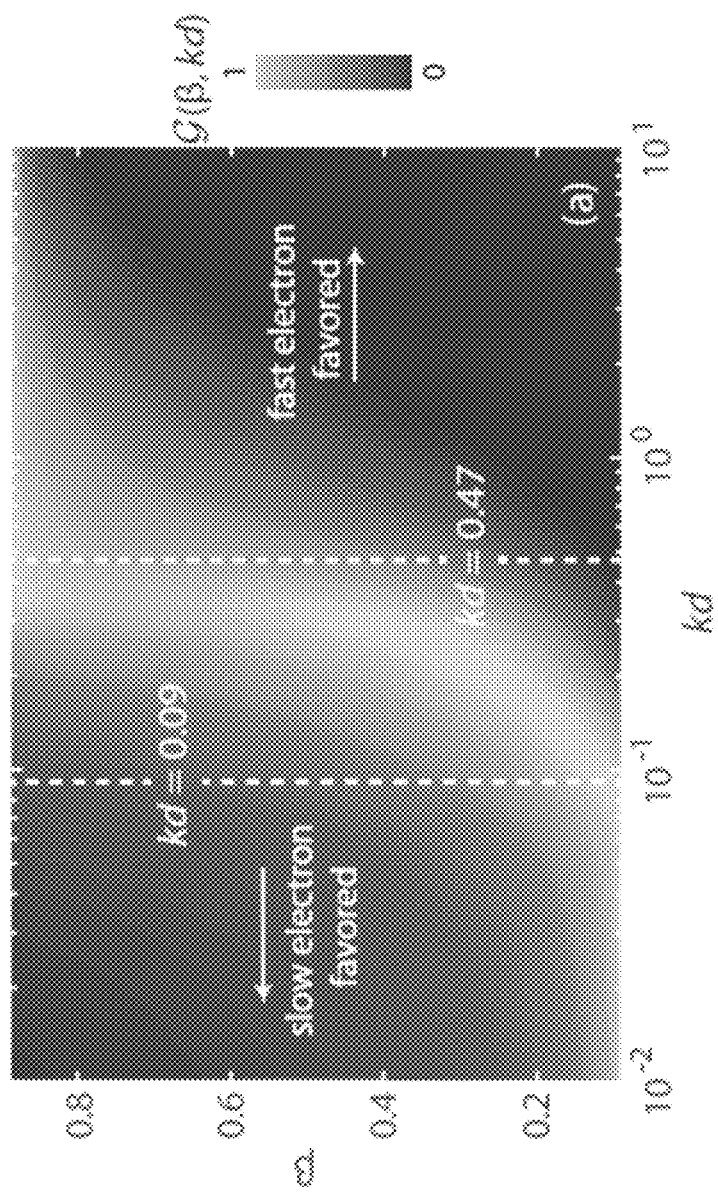
FIGS. 5A-5C show calculated optimal electron velocities for Smith-Purcell radiation induced in a grating.
Figures 5B, 5C:
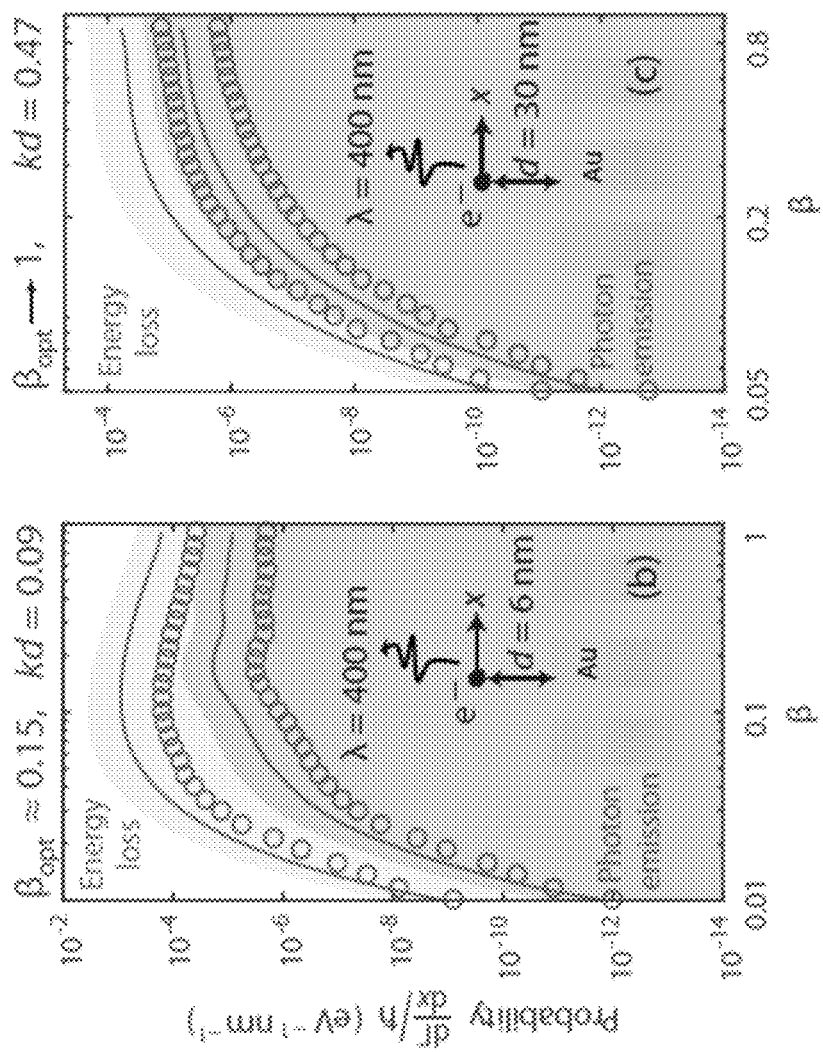

FIGS. 5A-5C show calculated optimal electron velocities for Smith-Purcell radiation induced in a grating. FIG. 5A illustrates the behavior of $\mathcal{G}(\beta, kd)$ (in Equation (8)), whose maxima indicate separation-dependent optimal electron velocities. Here $\mathcal{G}$ is normalized between 0 and 1 for each separation. The limit yields sharply contrasting predictions: slow electrons are optimal in the near field (kd≪1) and fast electrons are optimal in the far field (kd≫1). FIGS. 5B and 5C show energy loss and radiation rates with near-field and far-field separations, respectively. The circles represent full-wave simulations, the lines represent analytical results from Equation (8), and the shadings represent shape-independent limits from Equations (7a) and (7b).

The grating limit in Equation (8) exhibits the same asymptotic behavior as in Equations (7a) and (7b), thereby reinforcing the optimal-velocity configurations shown in FIGS. 4A and 4B. The (β,kd) dependence of $\mathcal{G}$, as shown in FIG. 5A, demonstrates that slow (fast) electrons can maximize Smith-Purcell radiation in the small (large) separation regime. The limit predictions are also verified by comparison with numerical simulations. At small separations (see FIG. 5B, with 6 nm separation), radiation and energy loss peak at velocity having β of about 0.15, consistent with the limit maximum. At large separations (see FIG. 5C, with 30 nm separation), both the limit and the numerical results grow monotonically with β.

Smith-Purcell Radiation in Dielectric Structures

Conventional materials used for Smith-Purcell radiation generation are usually metals. However, as the analytical model above revealed (see, e.g., FIG. 2), dielectric materials (e.g., semiconductors) can also be used. In fact, in certain spectral regions (e.g., EUV, visible, and near-infrared), silicon can be superior to metals. Based on the optical response theory (e.g., Equations (7a) and (7b)), the Smith-Purcell radiation at a specific frequency can be bounded by $$\frac{N(\omega)}{d\omega} \le \frac{|\chi|^2}{\mathrm{Im}\chi} \frac{q^2}{128\hbar\epsilon_0\omega^2\pi^4} \int_V \alpha^4 K_0^2(\alpha\rho) + \alpha^2 k^2 K_1^2(\alpha\rho) dV \tag{9}$$

where the impact of materials on Smith-Purcell radiation can be separated into the figure of merit (FOM) $|\chi|^2/\mathrm{Im}\chi$, where χ is the susceptibility of the material. According to Equation (9), lossless materials can be superior to metals, at least in certain spectral regions (e.g., visible and near infrared), because of the diverging factor. In addition, lossless materials can also be fabricated into various photonic structures that allow coupling electrons with bound states in the continuum (BICs) in these structures, thereby significantly increasing the radiation efficiency (see more details below with reference to FIGS. 20A-29B).

Figure 6:
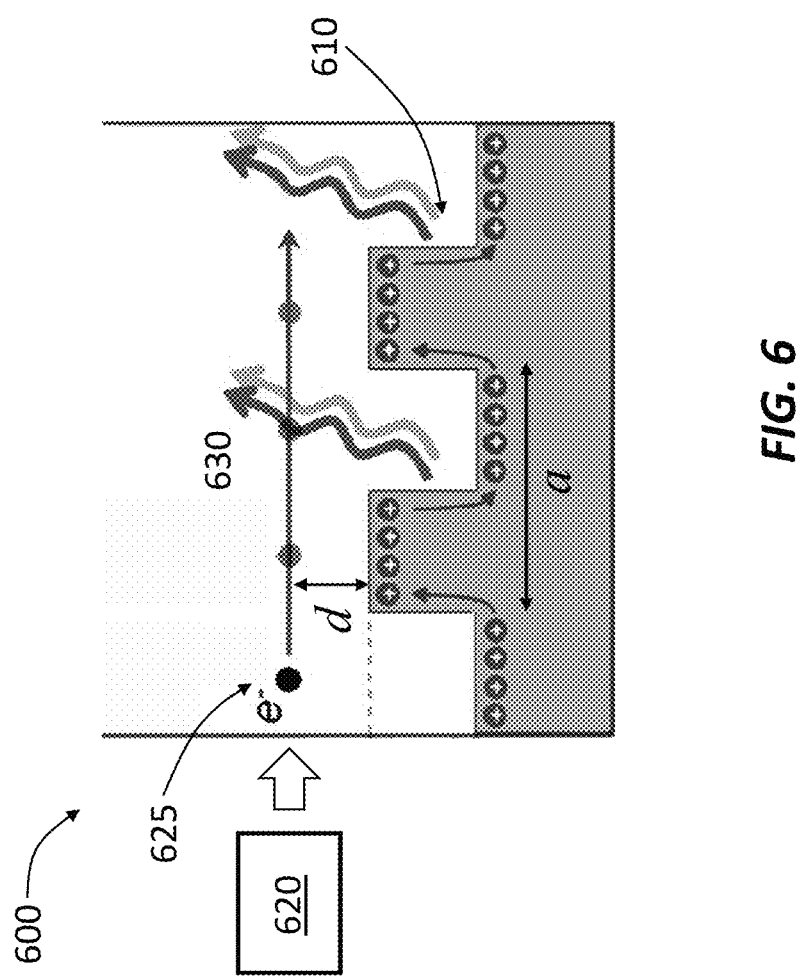
FIG. 6 shows a schematic of a light source including an electron beam source and a dielectric periodic structure to induce Smith-Purcell radiation in response to an electron beam from the electron beam source.

FIG. 6 shows a schematic of an apparatus 600 including a dielectric periodic structure 610 to induce Smith-Purcell radiation 630. The apparatus 600 also includes an electron source 620 to emit an electron beam 625 that propagates near the surface of the periodic structure 610. As described in the analytical framework above, the electron beam 625 can be either in the near-field or the far-field of the periodic structure 610 (see Equations 7(a) and 7(b)). For example, the distance d between the electron beam 625 and the periodic structure 610 can be less than about 5 times the wavelength of the Smith-Purcell radiation 630 (i.e. 5λ or less, where λ is the wavelength). In another example, the distance d can be substantially equal to or less than 50 nm (e.g., about 50 nm, about 40 nm, about 30 nm, about 20 nm, about 15 nm, about 10 nm, about 8 nm, about 6 nm, or less, including any values and sub ranges in between).

The periodic structure 610 can include various materials. In one example, the periodic structure 610 can include silicon, which can be configured to generate strong radiation in the EUV, optical, and near infrared regime. In addition, silicon can also be used to construct an all-silicon integrated light source (see, e.g., FIGS. 14A and 14B below with more details). In another example, the periodic structure can include lossless oxides and nitrides, such as $Si_3N_4$, $Al_2O_3$, $SiO_2$, $HfO_2$, $TiO_2$, and $MgF_2$, among others. In yet another example, the periodic structure 610 can include indium tin oxide (ITO), which is a transparent conductor and can be used to construct photonic crystals without static charges. Static charges may result in Coulomb repulsion of the incident electron beam and thus reduce the interaction efficiency between the electrons and the periodic structure 610.

In one example, the periodic structure 610 includes a one-dimensional (1D) periodic structure, such as a grating. In another example, the periodic structure 610 can include a two-dimensional (2D) periodic structure, such as an array of holes defined in a substrate. In yet another example, the periodic structure 610 can include a three-dimensional (3D) periodic structure, such as a woodpile photonic crystal.

The electron source 620 can be tunable to emit the electron beam 625 having different electron energies depending on the desired output wavelength of the Smith-Purcell radiation (see, e.g., Equation (1)). In one example, the electron source 620 can include a scanning electron microscope (SEM). In another example, the electron source 620 can include a field emitter array (FEA), which can be integrated with the periodic structure 610 (e.g., silicon grating) on the same substrate to form a compact light source.

In FIG. 6, the electron beam 625 is substantially parallel to the surface of the periodic structure 610 (i.e., 0 grazing angle). In another example, the grazing angle of the electron beam 625 with respect to the surface of the periodic structure 610 can be substantially equal to or less than 5° (e.g., about 5°, about 4°, about 3°, about 2°, about 1.5°, about 1°, about 0.5°, or less, including any values and sub ranges in between).

The wavelength of the Smith-Purcell radiation 630 depends at least on the period a of the periodic structure 610 and the electron energy of the electron beam 625 (see, e.g., Equation (1)). In one example, the period a of the periodic structure 610 can be about 50 nm to about 300 nm (e.g., about 50 nm, about 100 nm, about 150 nm, about 200 nm, about 250 nm, or about 300 nm, including any values and sub ranges in between), the electron energy can be about 1 keV to about 40 keV (e.g., about 1 keV, about 2 keV, about 3 keV, about 5 keV, about 10 keV, about 15 keV, about 20 keV, about 25 keV, about 30 keV, about 35 keV, or about 40 keV, including any values and sub ranges in between), and the wavelength of the Smith-Purcell radiation 630 can be about 300 nm to about 1600 nm (e.g., about 300 nm, about 400 nm, about 500 nm, about 750 nm, about 800 nm, about 1000 nm, about 1200 nm, about 1400 nm, about 1500 nm, about 1550 nm, or about 1600 nm, including any values and sub ranges in between).

In another example, high energy electrons (e.g., on the order of MeV or GeV) can also be used to generate Smith-Purcell radiation at extreme short wavelengths (e.g., x-ray). In yet another example, the periodic structure 610 can have a larger period a (e.g., on the order of about 10 µm) to generate terahertz (THz) radiation.

Smith-Purcell Radiation Source Based on Scanning Electron Microscope (SEM)

A SEM-Based Smith-Purcell Radiation Source

Figure 7:
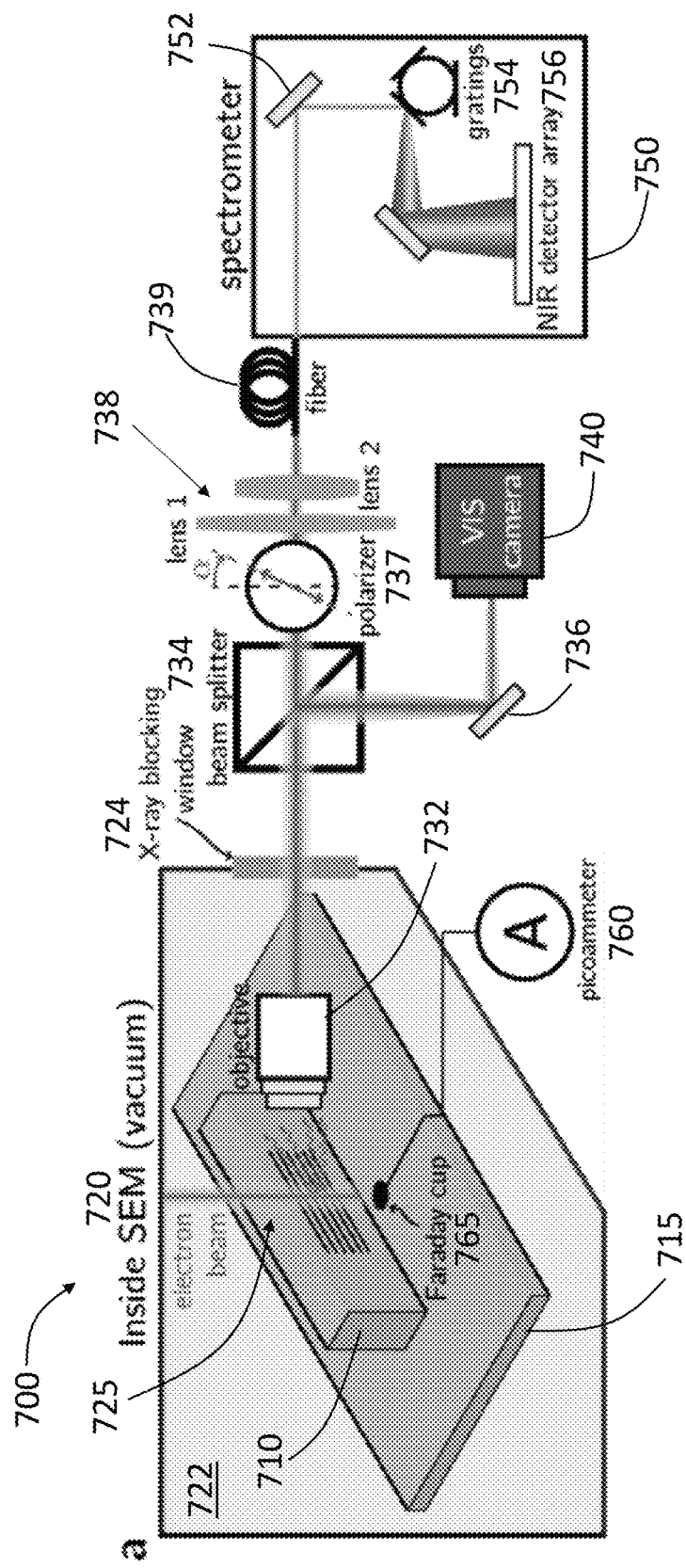
FIG. 7 shows a schematic of an apparatus using a scanning electron microscope (SEM) as the electron source to induce Smith-Purcell radiation.

FIG. 7 shows a schematic of an apparatus 700 using a scanning electron microscope (SEM) 720 as the electron source to induce Smith-Purcell radiation. The apparatus 700 includes a periodic structure 710 disposed in a vacuum chamber 722 of the SEM 720 (e.g., JEOL JSM-6010LA) to receive an electron beam 725 (provided by the SEM 720) at a grazing angle with respect to the grating plane. The electron beam 725 has an electron energy tunable between about 10 keV and about 20 keV.

The apparatus 700 also includes a picoammeter 760 connected to a Faraday cup 765 to measure the electron beam current. The grazing angle can be about 1.5° or less (i.e., nearly parallel to the grating plane). The interaction between the electron beam 725 and the periodic structure 710 generates Smith-Purcell radiation that is picked up by an objective 732 (e.g., a Nikon TU Plan Fluor 10× objective with a numerical aperture (NA) of 0.30). The vacuum chamber 722 includes a window 724 (e.g., an x-ray blocking window) to pass the Smith-Purcell radiation, which then propagates to a beam splitter 734.

A first portion of the Smith-Purcell radiation is directed by the beam splitter 734 to a camera 740 via a reflector 736. The camera 740 can include, for example, a charge-coupled device (CCD) to acquire monochrome images of the Smith-Purcell radiation in order to align the optical setup and spatially resolve the radiation.

A second portion of the Smith-Purcell radiation is transmitted through the beam splitter 734 and detected by a spectrometer 750 after a polarizer 737, a set of lenses 738, and a fiber 739. The spectrometer 750 (e.g., an Acton SP-2360-2300i spectrometer) can further include a reflector 752 to direct the second portion of the Smith-Purcell radiation to a grating 754, which diffracts the Smith-Purcell radiation to a near infrared detector 756 (e.g., a linear InGaAs photodiode detector array with detection range of about 0.8 µm to about 1.7 µm).

The blank-off plate of the SEM 720 is modified to include a 4.5" conflate viewport, which is configured with a leaded glass cover plate as the window 724 to allow the emitted light to be directed outside the SEM chamber 722. Inside the SEM vacuum chamber 722, the periodic structure 710 is held so that its surface is almost parallel to the electron beam 725 and efficient light coupling is achieved using the optical objective 732. For optical collection efficiency, it is helpful to have precise alignment of the periodic structure 710 with respect to the electron beam 725 and the objective 732. To facilitate this alignment, the holder 715 of the periodic structure 710 includes a translation stage (e.g., Thorlabs Inc MT1—½" translation stage with MT405 standard micrometer, ¼"-20 taps) and the stage adapter of the SEM 720 is connected to the bottom face of the stage. A Tedpella PELCO SEM clip cylindrical mount (Prod #: 15399-10) is attached to the top face of the stage in order to hold the periodic structure 710 at about 90 degrees.

Figure 8A:
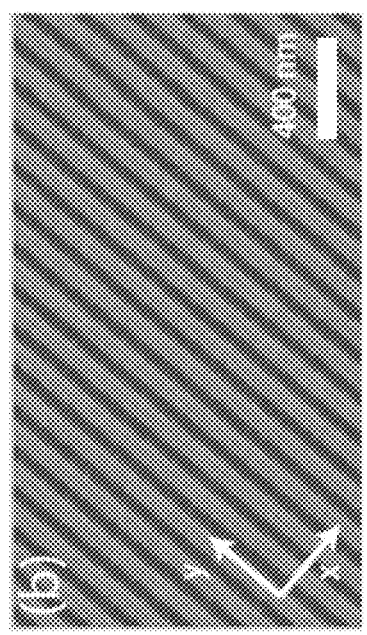
FIGS. 8A and 8B are SEM images of the periodic structure used in the apparatus shown in FIG. 7 and illustrated in a top view and a cross-sectional view, respectively.
Figure 8B:
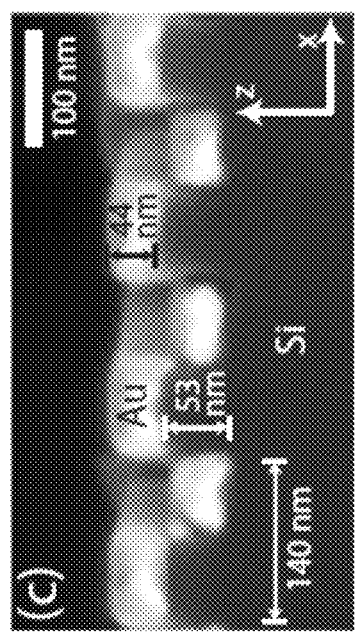

FIGS. 8A and 8B are SEM images of the periodic structure 710 illustrated in a top view and a cross-sectional view, respectively. The periodic structure 710 includes a silicon grating (single-crystalline silicon) deposited with gold. The silicon portion (above the substrate) has a thickness of about 53 nm and the gold portion has a thickness of about 44 nm, and the period of the periodic structure 710 is about 140 nm, as illustrated in FIG. 8B. The grating has a filling factor of about 50%.

Experimental Characterizations of Smith-Purcell Radiation

Figure 9:
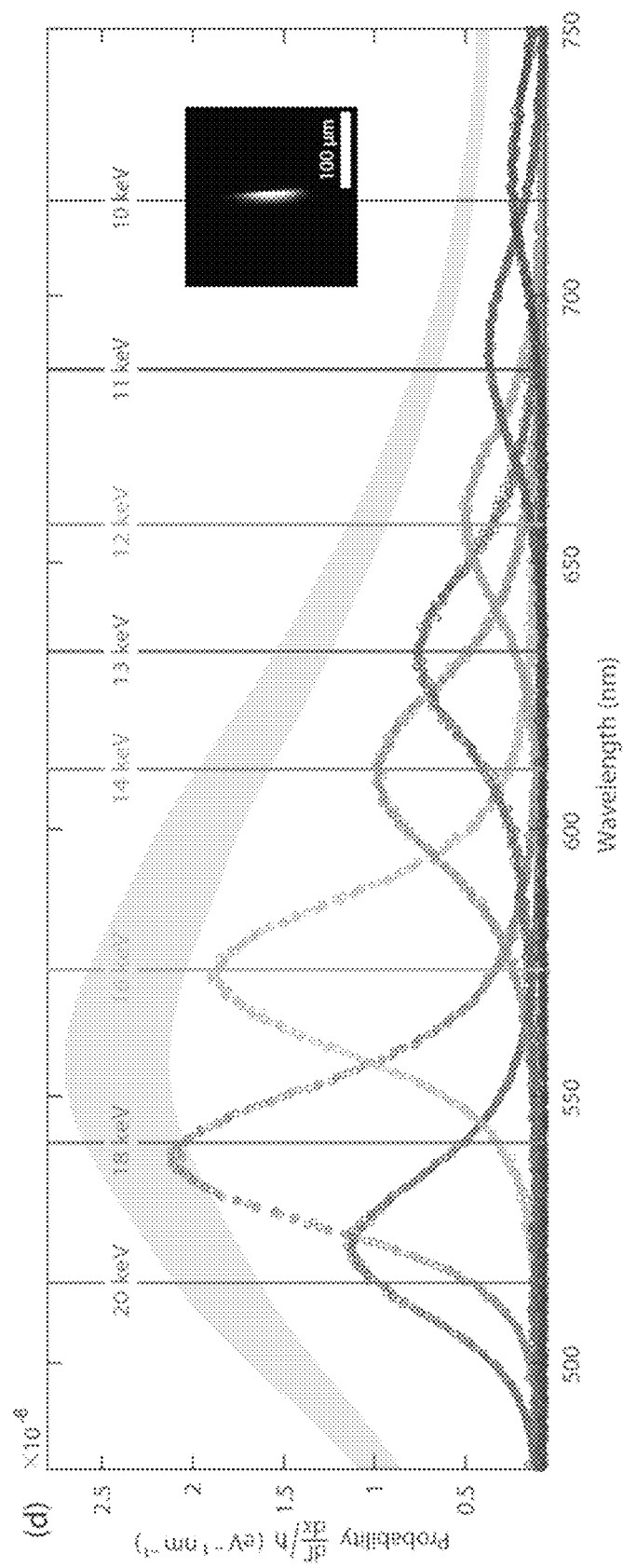
FIG. 9 shows quantitative measurement of the Smith-Purcell radiation generated by the apparatus shown in FIG. 7.

FIG. 9 shows quantitative measurement of the Smith-Purcell radiation generated by the apparatus 700 shown in FIG. 7. The inset is a camera image of the radiation. Solid lines mark the theoretical radiation wavelengths at the normal angle derived from Equation (1). The envelope (peak outline) of the measured spectra (dots) follows the theoretical upper limit (shaded to account for fabrication tolerance; calculated at each wavelength with the corresponding electron velocity for surface-normal radiation).

The measurement shown in FIG. 9 is performed on the first order (i.e., m=1) of the Smith-Purcell radiation appearing at wavelengths between about 500 nm and about 750 nm. In quantitative agreement with Equation (1) evaluated at normal emission angle (solid lines), the measured radiation spectra (dots) blue shift as the electron velocity increases. The absolute intensity of the collected radiation can be obtained via a calibration measurement (see details below). The upper limits, derived from Equation (6), for the surface-normal emission wavelengths (i.e., $\lambda = a/\beta$) are evaluated at the center of the interaction region. In this region, the height d is at about 140 nm and kd is about 1.5, varying with beam energy. The evaluated upper limits are indicated by the shading in FIG. 9 to account for the thickness uncertainty (about ±1.5 nm).

The envelope spanned by the measurement peaks follows the upper-limit line shape across the visible spectrum: both the theoretical limit and the measured intensities peak near 550 nm and decrease in a commensurate manner for other wavelengths. This line shape originates from two competing factors. At shorter wavelengths, the material factor $|\chi^2|/\text{Im}\chi$ decreases significantly for both Au and Si (see, e.g., FIG. 2), which accounts for the reduced radiation intensity. At longer wavelengths, the major constraint becomes the less efficient interaction between the electrons and the structure, as the electron-beam diameters increase for the reduced brightness of the electron gun (tungsten) at lower acceleration voltages.

Figure 10:
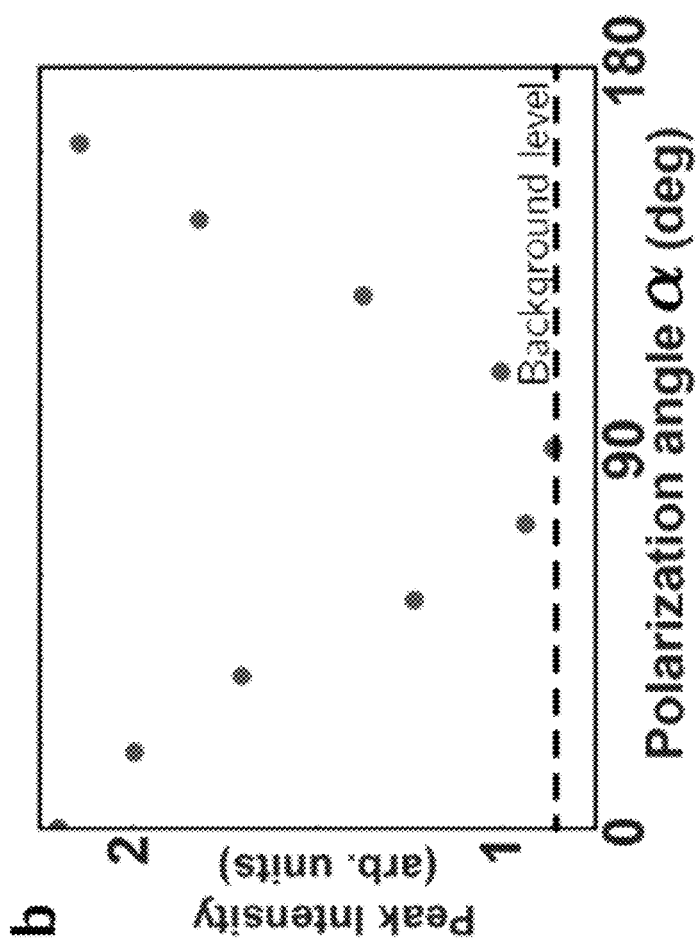
FIG. 10 shows measured Smith-Purcell radiation intensity in the apparatus shown in FIG. 7 as a function of polarization angle.

FIG. 10 shows measured Smith-Purcell radiation intensity as a function of polarization angles. The measurement was performed along the direction of the electron beam 725 in FIG. 7. Radiation in the perpendicular polarization is measured and used as the background level. FIG. 10 verifies that Smith-Purcell radiation is linearly polarized along the electron beam propagation direction, as the minimum of the signal is recorded at a polarization perpendicular to the beam propagation direction.

Figure 11B:
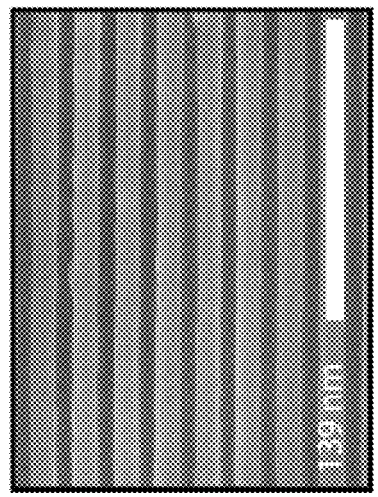
FIGS. 11A and 11B are SEM images of aluminum-coated periodic structures that can be used in the apparatus shown in FIG. 7 to generate tunable Smith-Purcell radiation.
Figure 11A:
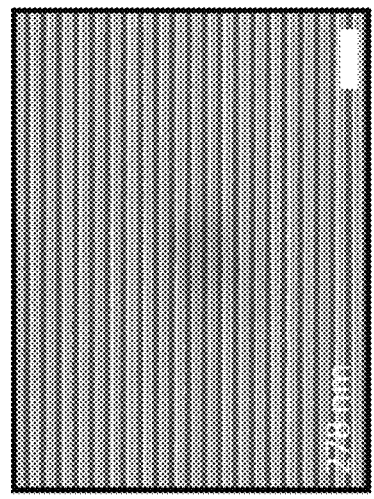

FIGS. 11A and 11B are SEM images of aluminum-coated periodic structures that can be used in the apparatus 700 shown in FIG. 7 to generate tunable Smith-Purcell radiation. In practice, it can be convenient to use aluminum to construct the periodic structures to take advantage of existing metallization techniques in back end of the line very large scale integration (VLSI) processes. The grating shown in FIG. 11A has a period of about 278 nm and the grating shown in FIG. 11B has a period of about 139 nm. The white bars in FIGS. 11A and 11B are about 1 μm long.

Figures 11C, 11D:
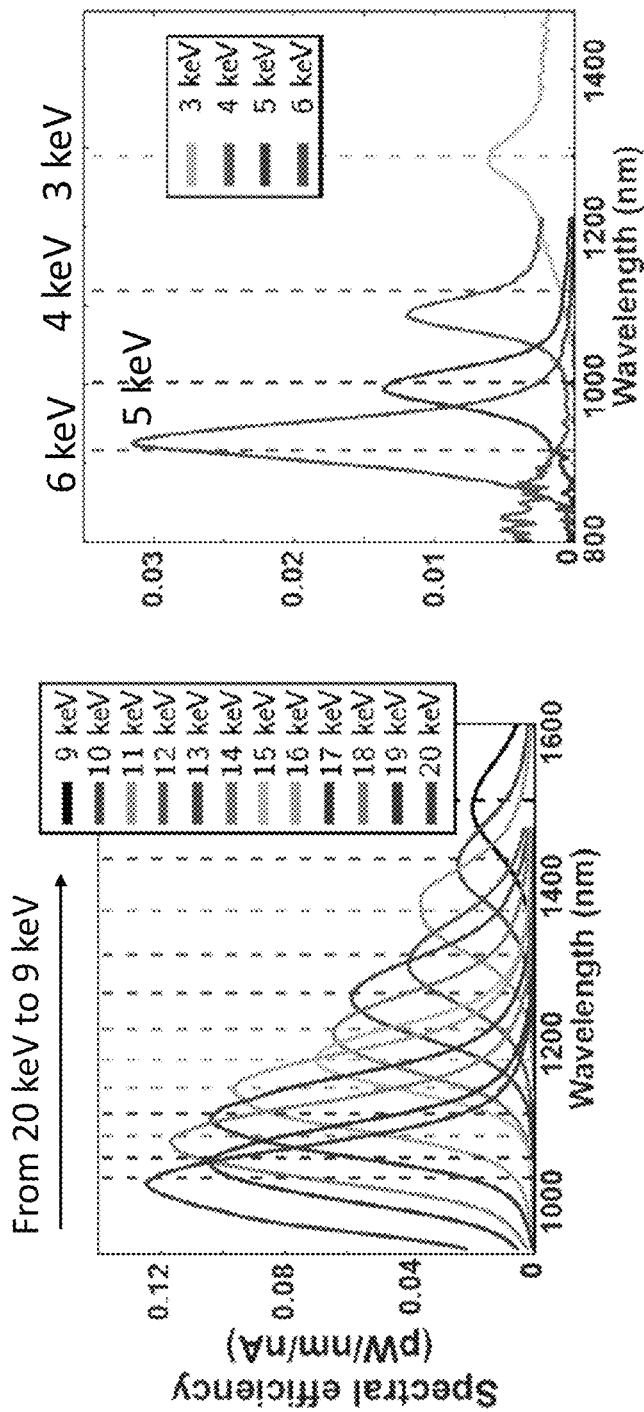
FIGS. 11C and 11D are measured spectral intensities of Smith-Purcell radiation using the periodic structures shown in FIGS. 11A and 11B, respectively.

FIGS. 11C and 11D are measured spectral intensities of Smith-Purcell radiation using the periodic structures shown in FIGS. 11A and 11B, respectively. Aluminum-coated silicon gratings can have a slightly better emission efficiency than pure silicon gratings. As used herein, the emission efficiency is defined as the ratio of output power to the input current times the electron beam voltage. This better performance achieved by aluminum-coated gratings may be attributed to better conductivity of the aluminum-coated samples.

Simulations of Smith-Purcell Radiation Power Spectrum

Time-domain simulations were carried out to estimate the power spectrum of photons emitted by electrons propagating at a given height h above a periodic structure. This simulation setup was designed to mimic the experimental characterizations described above. With some approximations discussed below, the simulated power spectrum can be fitted to the measured spectrum with a single fitting parameter.

In the simulation setup, a single electron of charge –e is flying above a grating made of crystalline silicon at a height h and normalized velocity $\beta = v/c$. The grating has a period L along the x direction. The trajectory of the electron is in a plane parallel to the grating plane and along its periodicity:

$$v(t) = (\beta c, 0, 0)^T \tag{10}$$

$$r(t) = (x_0 + \beta c, t, y_0, Z_0)^T \tag{11}$$

A commercial-grade simulator based on the finite-difference time-domain method was used to perform the calculations. In time-domain, a convenient way to mimic the polarization field of a moving charged particle is to use a delayed array of dipoles. The current and polarization induced by the trajectory of the electron can be expressed as:

$$J(r, \omega) = -e\, e^{-i\frac{\omega x}{v}} \delta(y - y_0)\delta(z - z_0)\hat{x} \tag{12}\text{-}(13)$$

$$P(r, \omega) = i\frac{e}{\omega} e^{-i\frac{\omega x}{v}} \delta(y - y_0)\delta(z - z_0)\hat{x}$$

The polarization distribution is a continuous function that can be approximated over a finite length (e.g., one unit cell) by a series of dipoles uniformly spaced and delayed in time domain. The dipole moment can be set as $$P_0 = \frac{e\, sim_x}{N_{dip}} \delta(z - z_0) \tag{14}$$

In this case, the dipoles can create a polarization density in frequency-domain in the form:

$$P_k(r, \omega) = i\frac{e\, sim_x}{\omega N_{dip}} e^{-i\frac{\omega x_k}{v}} \delta(x - x_k)\delta(y - y_0)\delta(z - z_0)\hat{x} = \tag{15}$$

$$i\frac{e}{\omega} \Delta x\, e^{-i\frac{\omega x_k}{v}} \delta(x - x_k)\delta(y - y_0)\delta(z - z_0)\hat{x}$$

where $\Delta x = sim_x/N_{dip}$ is the uniform spacing between dipoles along the x direction, equal to the ratio of the simulation length along x to the total number of dipoles $N_{dip}$. This discretization can be used to approximate the exact polarization density $P(r, \omega)$ as a Riemann sum.

The simulation further defines the function $\gamma_x : x' \to \delta(x-x')$ $e^{-i\omega x'/v}$:

$$\sum_{k=1}^{N_{dip}} P_k(r, \omega) = i\frac{e}{\omega}\delta(y - y_0)\delta(z - z_0)\hat{x}\Delta x \left( \sum_{k=1}^{N_{dip}} e^{-i\frac{\omega x_k}{v}} \delta(x - x_k) \right) \tag{16}\text{-}(20)$$

-continued $$= i\frac{e}{\omega}\delta(y-y_0)\delta(z-z_0)\hat{x}\Delta x\left(\sum_{k=1}^{N_{dip}}\gamma(x_k)\right)$$

$$\to_{N_{dip}\to\infty} i\frac{e}{\omega}\delta(y-y_0)\delta(z-z_0)\hat{x}\int\gamma_x(x')dx'$$

$$= i\frac{e}{\omega}\delta(y-y_0)\delta(z-z_0)\hat{x}\int\delta(x-x')e^{-i\frac{\omega x'}{v}}dx'$$

$$= P(r,\omega)$$

A delayed dipole source in Lumerical has the following form in frequency-domain:

$$p_{k,FDTD}(r,\omega) = p_{base}s(\omega)e^{-i\frac{\omega x_k}{v}} \quad (21)$$

where $p_{base}$ is the base amplitude imposed by the simulation and $s(\omega)$ is the spectral source norm of the dipole. To match this expression with $p_k(\omega, r)$, one can multiply the dipole moment by a normalization factor $\alpha$ defined as:

$$\alpha(\omega) = \frac{e\Delta x}{p_{base}s(\omega)\omega} \quad (22)$$

This normalization, because of its frequency-dependence, can be useful in determining the right spectral line shape and converting the numerical result into "real" units (e.g., number of photons, Watts, etc.).

A more comprehensive numerical approach may be performed by taking into account the electron beam diameter and angular spread, in addition to the angle between the electron beam propagation direction and the grating, before integrating over multiple angles and heights of interaction. There can be two issues of any numerics simulating the flight of an electron impinging on a bulk, but these two issues can be bypassed by assuming that the electron flies at a constant height h in our simulation setup.

The first issue is that if the trajectory of the electron is oblique, some of the dipoles generating the induced polarization may be arbitrarily close to the surface or inside the bulk. This may be a problem as soon as the imaginary part of the refractive index is not exactly zero. In silicon, over the 800-1600 nm wavelength range, it can be safely assumed that the material is transparent and has a constant refractive index as $k<10^{-3}$ and the refractive index n varies by less than 5%.

The second issue arises from neglecting nonlocal effects, as the simulation setup may suffer from a strong dependence on the mesh accuracy for dipole sources injected arbitrarily close to the grating. Thus, assuming that the electron flies at a constant height above the grating can by-pass the two difficulties mentioned above. The height was chosen to be equal to the exponential decay factor of fields inside the grating when the material is a perfect conductor, which does not depend on the material permittivity:

$$h_{eff} = \frac{\gamma\beta\lambda}{4\pi} \approx \frac{L}{4\pi} \quad (23)$$

where $\gamma=(1-\beta^2)^{-1/2}$ and $\lambda$ is the radiation wavelength.

Equation (23) can be simplified by using the Smith-Purcell relation that connects the radiation wavelength to the velocity of the electron and the emission angle θ, measured with respect to the direction of the electron trajectory (forward):

$$\lambda = L\left(\frac{1}{\beta} - \cos\theta\right) \quad (24)$$

The general form of Equation (24) displays a diffractive integer index m. Only first-order Smith-Purcell radiation was observed in the experimental characterization over the wavelength range between 800 nm about 1600 nm, so m=1.

Equation (23) may appear to be a very rough approximation, as silicon is a perfectly transparent material over the wavelength range studied here. However, the simulation is only interested in fitting the numerics with experimental data. Using the actual effective height of interaction only scales the numerics by an exponential factor $e^{(-h_{eff}/h'_{eff})}$, where $h_{eff} \sim h'_{eff}$. This scaling of the height simply results in a scaling of the fitting parameter (assuming the effective height is independent of the electron speed, which seems to be a fair approximation from Equation (23) in the non-relativistic case). For the samples studied herein, $h_{eff}=22.75\pm0.16$ nm (for L=278 nm) and $h_{eff}=11.42\pm0.03$ nm (for L=139 nm).

After running the simulation, the far field radiation E(f) can be extracted with a monitor positioned far enough from the electron beam (farther than several wavelengths), in units of $W/Hz^2=J/Hz$. Thus, E(f) is analogous to the spectral energy density. The generated number of photons per electron can readily be derived from the spectral density of energy:

$$N_{SP} = \left|\int df \frac{E(f)}{hf}\right| \quad (25)$$

The absolute output power can also be computed as:

$$\text{Power}_{SP} = \frac{I_{mes}}{e}\left|\int E(f)df\right| = \frac{I_{mes}c}{e}\left|\int E(\lambda)\frac{d\lambda}{\lambda^2}\right| \quad (26)$$

where $I_{mes}$ is the total current (for instance, measured from the experimental setup).

Wavelength Calibration

The linear photodiode array is first calibrated at a central wavelength of 1000 nm, by using the grating second order from narrow bandwidth lasers at 532.2 nm and (635±5).2 nm. It is observed that these laser wavelengths are shifted from their calibrated value when shifting the central wavelength. Therefore, the shifted wavelength was measured as a function of the central wavelength and the data was corrected with a linear interpolation:

$$\lambda^r = \frac{\lambda_2^r - \lambda_1^r}{\lambda_2^m - \lambda_1^m}\lambda^m + \frac{\lambda_2^m + \lambda_1^m}{\lambda_2^m - \lambda_1^m} \quad (27)$$

where the $\lambda^r$ is the real wavelength, $\lambda^m$ the measured one, and the {1, 2} indices denote the two laser peaks used for wavelength calibration.

Polarization Selection and Background Definition

Smith-Purcell radiation is linearly polarized along the electron beam propagation direction. This observation was verified experimentally per the results in FIG. 10, as the minimum of the signal is recorded at a polarization perpendicular to the beam propagation direction. This observation can be used to subtract the background signal, which is defined as any other source of electron-beam driven radiation, such as light from local defects and from coherent and incoherent processes that do not arise from the periodic structure of the material (commonly referred to as cathodoluminescence). It is assumed that radiation from these other processes is isotropic. In some cases, the measurement along the electron beam propagation direction yields a signal proportional to $(E_{SP}+E_{CL}/2^{1/2})^2$, where $E_{SP}$ (resp. $E_{CL}$) is the electric field associated with Smith-Purcell (resp. cathodoluminescence) radiation. The measurement along the perpendicular yields $(E_{CL}/2^{1/2})^2$. Subtracting the background yields a signal proportional to:

$$|E_{SP}+E_{CL}/\sqrt{2}|^2-|E_{CL}/\sqrt{2}|^2=E_{SP}(E_{SP}+\sqrt{2}E_{CL})\approx E_{SP}^2 \quad (28)$$

when $E_{SP}\gg E_{CP}$, which was experimentally verified for large kinetic electron beam kinetic energies. However, it is expected to record some part of the cathodoluminescence signal when the electron beam energy is small, as $E_{SP}\sim E_{CL}$.

Calibration Measurement

Figures 12A, 12B, 12C:
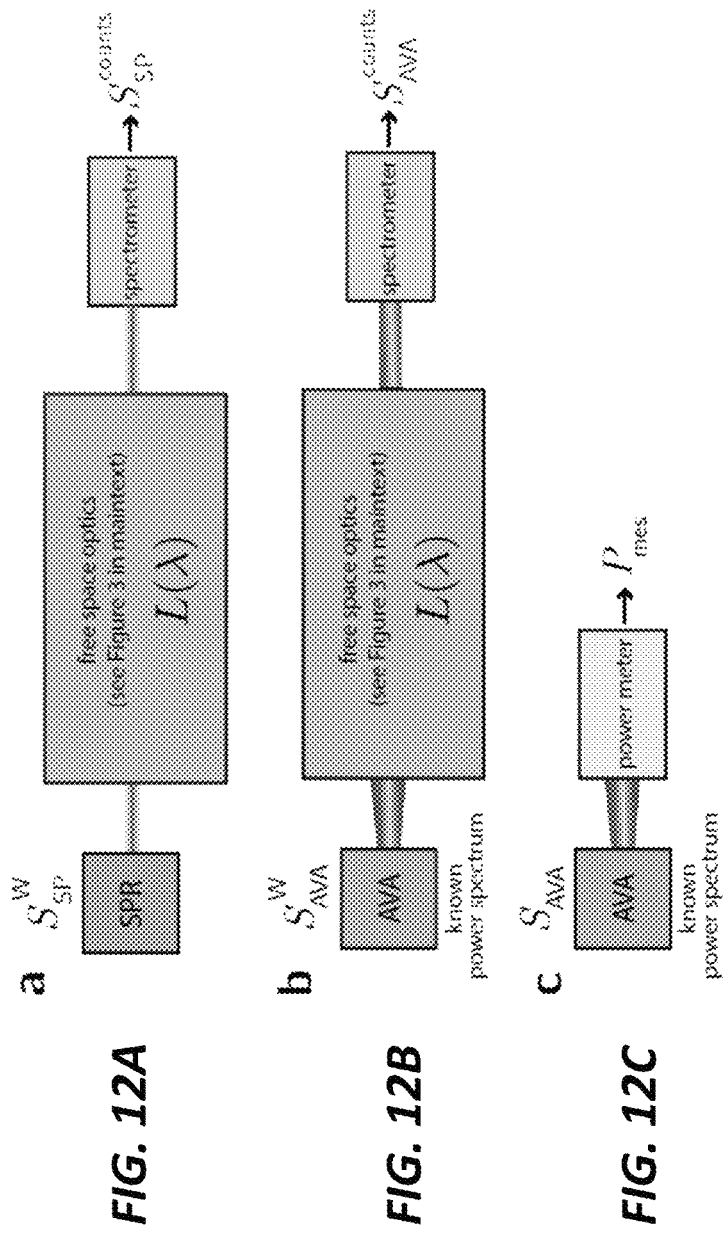
FIGS. 12A-12C illustrates a calibration measurement process in a system to generate Smith-Purcell radiation.

FIGS. 12A-12C illustrates a calibration measurement process. The Smith-Purcell radiation signal is measured through a set of optical components resulting in wavelength-dependent loss function $L(\lambda)$ and detection by the spectrometer of the signal $S^{counts}_{SP}$ (FIG. 12A). The known spectrum of a calibrated source AVA is measured through the same set of optical components as shown in FIG. 12B, resulting in the detection by the spectrometer of the signal $S^{counts}_{AVA}$. The effective area factor is normalized by measuring the integrated power of the calibrated source (AVA) with a power meter.

The process illustrated in FIGS. 12A-12B can be used to measure the absolute value of the Smith-Purcell radiation. In the optical setup, the absolute value of the radiation (in units of W/nm) is attenuated by a wavelength-dependent loss function $L(\lambda)$, which encompasses absorption, reflections, and the quantum efficiency of the detector, among others. The signal detected by the spectrometer is in units of counts/nm, thus $L(\lambda)$ is in units of counts/W:

$$S_{SP}^{counts}=L(\lambda)\cdot S_{SP}^{W} \quad (29)$$

$$S_{AVA}^{counts}=L(\lambda)\cdot S_{AVA}^{W} \quad (30)$$

The value of the signal before the losses, knowing the absolute value of the calibrated source, and its resulting spectrum measured can be acquired by the spectrometer (see FIG. 12B):

$$S_{SP}^{W}=S_{SP}^{counts}\cdot \frac{S_{AVA}^{W}}{S_{AVA}^{counts}} \quad (31)$$

The power spectrum of the calibrated source is actually given in units of irradiance (Watts/nm/unit area). This dependence per unit area can be modelled by an effective area factor corresponding to the size of the emitter. It is assumed that this effective area is wavelength-independent. Therefore, the effective area can be computed by measuring the source total power $P_{mes}$ with a power meter (see FIG. 12C):

$$A_{eff}=\frac{P_{mes}}{\int_{\lambda_{min}}^{\lambda_{max}} S_{AVA}(\lambda)d\lambda} \quad (32)$$

where $S_{AVA}$ is in units of Watts/nm/unit area, and $[\lambda_{min}, \lambda_{max}]$ is the power meter detection bandwidth. Then, $S^{W}_{AVA}$ can be acquired from the data:

$$S_{AVA}^{W}=S_{AVA}\cdot A_{eff} \quad (33)$$

Sometimes negative values of the spectral power were observed, after subtraction of the polarization background. When integrating the total power, first the main peak was fit with a single Gaussian distribution, in order not to count the previously mentioned negative values. The power meter used in this experiment (Newport 918-UV) also has a wavelength dependent responsivity $R_\lambda$, which should be taken into account when evaluating the total power. The displayed power by the power meter assumes that all photons have a given wavelength, set to 532 nm in this experiment. Thus, the measured power can be deduced from the displayed power $P_{dis}$ from the following formula:

$$P_{mes}=\frac{\int_{\lambda_{min}}^{\lambda_{min}} R_{532nm} S_{AVA}(\lambda)d\lambda}{\int_{\lambda_{min}}^{\lambda_{min}} R_\lambda S_{AVA}(\lambda)d\lambda} P_{dis} \quad (34)$$

Matching Power Estimates From Experiments With Simulations

To fully describe the simulation setup, it is useful to determine the number of unit cells above which the electron is flying. It is a finite number and a function of the angle between the electron beam propagation direction and the grating direction. In the experiment, the electron beam impinges onto the sample at a nonzero angle which determines a finite number of unit cells around the point of collision with the surface, in which the electrons interact and generate Smith-Purcell radiation.

The radiation contribution from other areas, farther from the point of collision, is usually negligible. The backscattering coefficient $\eta$ that sets the portion of electrons reflected while maintaining their angle of incidence can be generally estimated as:

$$\eta=\frac{1}{(1+\sin\theta)^p} \text{ and } p=9/\sqrt{Z} \quad (35)$$

where Z is the material atomic number. In the case of pure silicon and an impinging angle of about 1°, $\eta$ is about 0.95, which means that most electrons get elastically scattered. This allows the simulation to derive an analytic relation between $\theta_{fit}$ and $N_{UC}$.

Figure 13B:
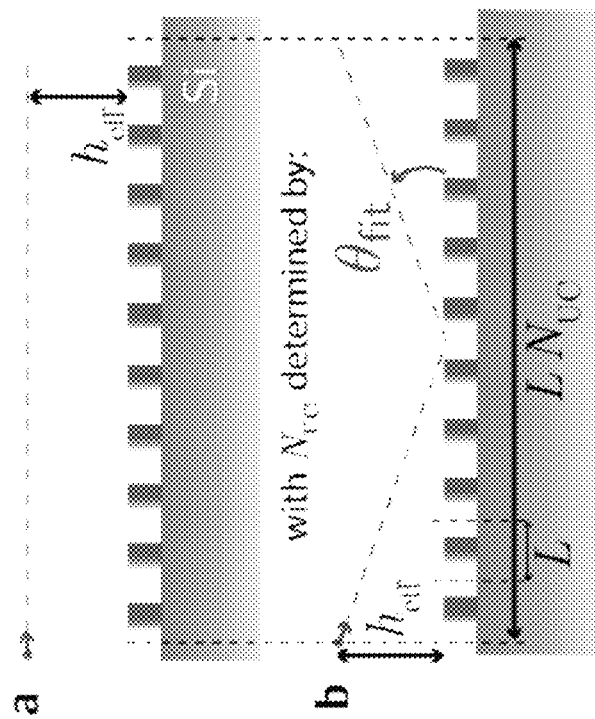
FIG. 13B shows a simulation setup illustrating the determination of fitting angle parameter $\theta_{fit}$.
Figure 13A:
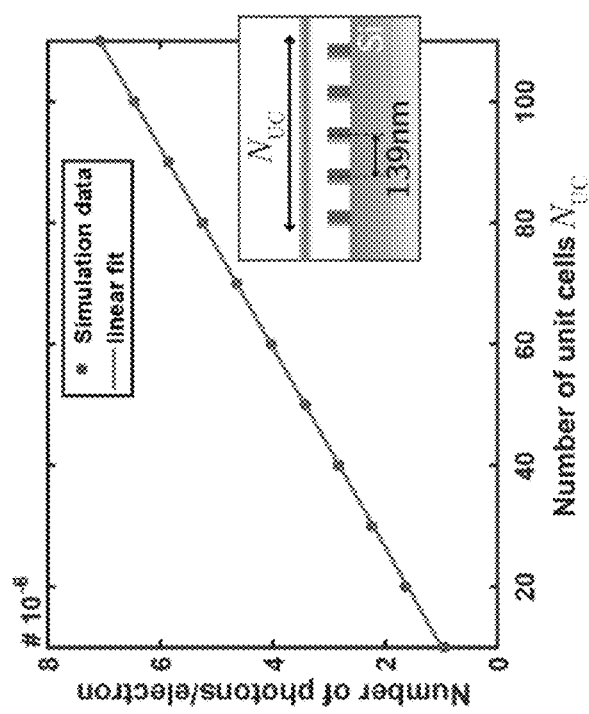
FIG. 13A illustrates the convergence of simulated output power per unit cell for a large number of unit cells.

FIG. 13A illustrates the convergence of output power per unit cell for a large number of unit cells in simulations. FIG. 13B shows a simulation setup illustrating the determination of fitting angle parameter $\theta_{fit}$. The total output power is fitted to a linear function of the number of unit $N_{UC}$ cells with R>0.99. It is thus possible to approximate the linear factor by the ratio of output power to $N_{UC}$ for large $N_{UC}$. In the simulation setup, a single electron flies at the effective height $h_{eff}$, given by Equation (23), above a finite number of unit cells $N_{UC}$. $N_{UC}$ is determined by fitting the total power from the simulation to the experimental data. $\theta_{fit}$ can be determined from $N_{UC}$ with the geometrical construction shown in FIG. 13B.

The electron beam angle (that sets the number of unit cells) is used as the single fitting parameter to match the total power of each simulation to the measured power. The number of unit cells $N_{UC}$ can be equivalently chosen as the single fitting parameter, as $N_{UC}$ and $\theta_{fit}$ are connected by a simple geometrical construction shown in FIG. 13B assuming elastic scattering of the electron. This allows one to determine an effective simulation setup matching the experimental results.

First, the effective spectral density of energy per unit cell is determined by running the simulation for a large number of unit cells (here, 110 unit cells is sufficient). It is observed that the number of photons per electron per unit cell, or equivalently the output power per unit cell (for a given electron beam current) converges for large number of unit cells. Equivalently, the total number of photons per electron is a linear function of the number of unit cells in the simulation, as can be seen in FIG. 13A. FIG. 13A is plotted for L=139 nm and an electron with a kinetic energy of 3 keV at a distance $h_{eff}$=11.2 nm from the grating, but it is observed that similar behaviors with different energies and geometries also occur. For large number of unit cells NUC, the proportionality factor of this linear dependence can be approximated as the ratio of the output power to $N_{UC}$ for large N. In FIG. 13A, the error of this approximation is about 5%.

The effective number of unit cells is then determined by matching the total power from the simulation to the experimentally measured power. The effective number the fitting angle $\theta_{fit}$ can be derived as:

$$\theta_{fit} = 2\arctan\frac{h_{eff}}{LN_{UC}} \qquad (36)$$

The procedures described above yield values of the fitting parameters $\theta_{fit}$=(0.0020±0.00059)° for 139 nm and $\theta_{fit}$=(0.0017±0.00071)° for 278 nm pitch gratings. The value of the effective angle is larger than the angle measured in the experimental setup (1±0.5)°. This may be attributed to the fact that the angular spread of the electron beam and its diameter are neglected. However, consistent values were acquired in the experimental data for the 139 nm- and 278 nm-pitch gratings, thereby demonstrating the consistency of the method.

Silicon-Based Integrated Smith-Purcell Radiation Source

Figure 14A:
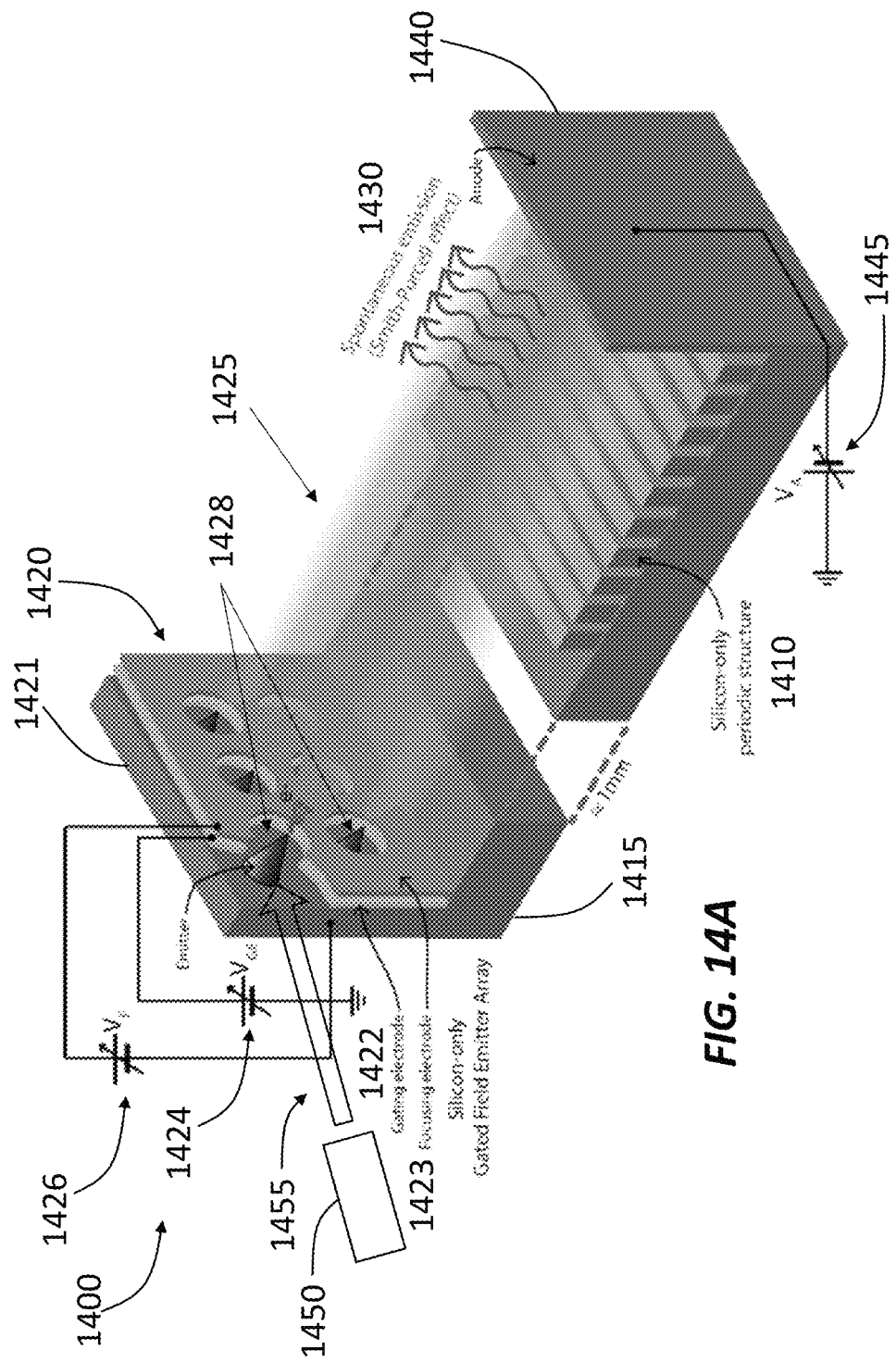
FIGS. 14A and 14B show a perspective view and a side view, respectively, of a silicon-based integrated light source that emits Smith-Purcell radiation.
Figure 14B:
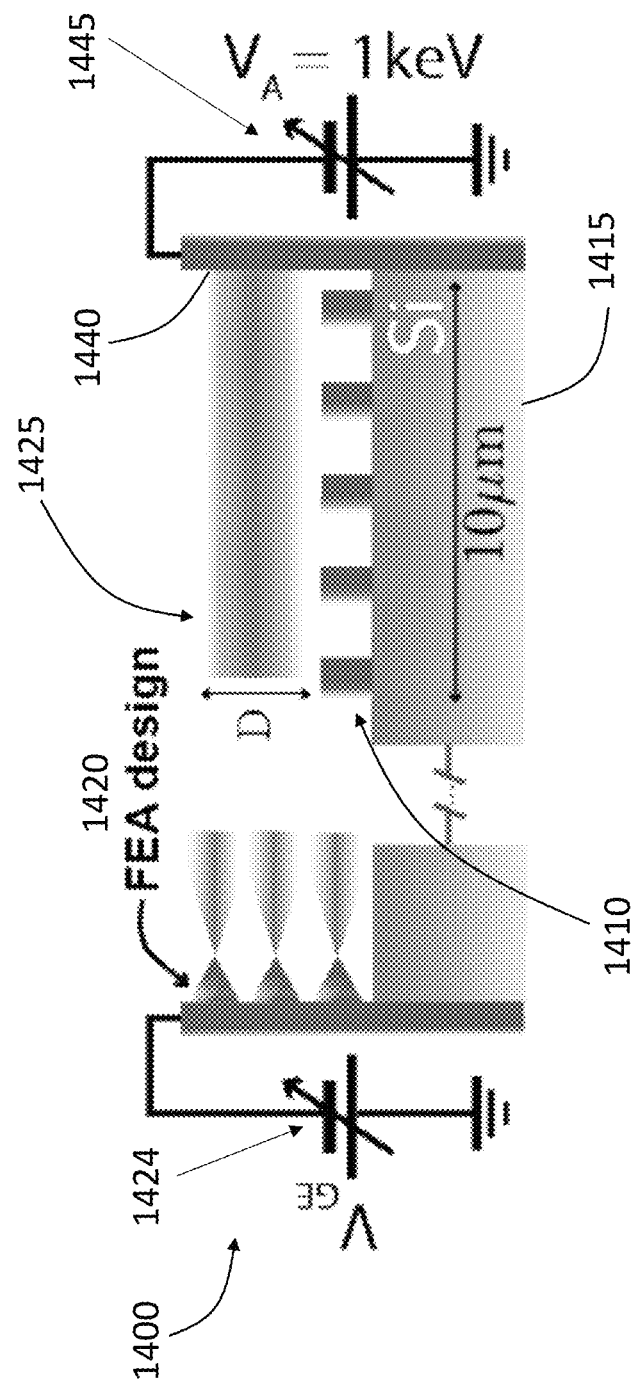

FIGS. 14A and 14B show a perspective view and a side view, respectively, of a silicon-based integrated light source 1400 based on Smith-Purcell radiation. The light source 1400 includes a field emitter array (FEA) 1420 as an electron source that emits an electron beam 1425 propagating across a periodic structure 1410. Both the FEA 1420 and the periodic structure 1410 can be fabricated on a common substrate 1415 (e.g., a silicon substrate), thereby forming an integrated, compact, and silicon-only tunable light source. In addition, the light source 1400 can be disposed in a vacuum condition (e.g., within a vacuum chamber) to facilitate the operation of the FEA 1420.

The FEA 1420 further includes a base substrate 1421 and an array of emitters 1428 formed on the base substrate 1421. The base substrate 1421 can also function as a cathode in the apparatus 1400. A gating electrode 1422 is disposed on the base substrate 1421 and includes an array of holes, each of which is aligned with a corresponding emitter in the array of emitters 1428. A focusing electrode 1423 is disposed on the gating electrode 1422 and also defines an array of holes aligned with the array of emitters 1428. A gating voltage source 1424 is employed to bias the gating electrode 1422 with respect to the base substrate 1421 so as to induce the tunneling effect (see details below), and a focusing voltage source 1426 is employed to bias the focusing electrode 1423 with respect to the base substrate 1421 to collimate the emitted electron beam 1425 (see FIG. 14B).

The FEA 1420 is disposed on one end of the periodic structure 1410 and an anode 1440 is disposed on the other end of the periodic structure 1410 to accelerate and collect the electron beam 1425 after interaction with the periodic structure 1410. An anode voltage source 1445 is electrically connected to the anode 1440 to apply a bias voltage on the anode 1440 so as to facilitate the electron acceleration and collection.

The FEA 1420 can emit the electron beam 1425 via quantum tunneling. In this process, each emitter in the array of emitters 1428 has a sharp nanometer-scale tip (e.g., having a conical shape), which is subject to a large electric field during operation. Electric field on the order of 1 GV/m can be used to tunnel-emit electrons from silicon and most metal surfaces. In one example, the electric field can be supplied by a DC field from the gating electrode 1422 in the vicinity of the tip (i.e., gated FEA). In another example, the electric field can be supplied by a laser 1450 (i.e., pulsed FEA), which can direct a light pulse 1455 on the FEA 1420 to induce the tunneling (see FIGS. 14C and 14D for more details below). For instance, with a 10× filed enhancement at the tip, optical tunneling from a silicon FEA can be achieved with a fluence of about 16 mJ/cm² at a wavelength of about 800 nm. This optical approach can also achieve electron bunching on the femtosecond and sub-femtosecond scale.

In either case, the strong field induces the tunneling of electrons at the tip of the emitters 1428, thereby generating the electron beam 1425. After emission, the electrons can be accelerated and focused using, for example, a set of cathodes and/or other gates. The kinetic energy of electrons in the electron beam 1425 close to the tip is usually very small (e.g., close to the Fermi Level of the emitter), and cathodes are usually biased at a much larger kinetic energy (e.g., greater than 1 keV). The cathode can be positioned far from the tip, in which case the kinetic energy of the electrons in the vicinity of the cathode can be substantially equal to the bias voltage of the cathode.

Usually, the addition of the focusing electrode 1423 results in a focusing current of electrons going through the focusing gate 1423. The focusing current may be lost because electrons in the focusing current usually do not tunnel and therefore do not contribute to the current at the tip. Accordingly, FEAs having a focusing electrode usually provides a lower current at the cathode.

In the apparatus 1400, the FEA 1420 is mounted perpendicular to the periodic structure 1410 such that the emitted electron beam 1420 can traverse the periodic structure 1410 to induce the Smith-Purcell radiation 1430. In the case of pulsed FEAs, the array of emitters can be fabricated in the same plane as the periodic structure (see, e.g., FIG. 14D). The gating electrode 1422 can be gated at a voltage in the range of about 10 V to about 100V, and the anode 1440 can be gated a higher voltage of about 1 kV or more. The anode 1440 may also be gated at a lower voltage (e.g., about 1 kV, about 800 V, about 500 V, about 200 V, about 100 V, or less) in a small-scale device (e.g., the length of the periodic structure 1410 is 10 mm or less) so long as the electrons can be accelerated to the desired electron energy. The anode voltage can be tuned in order to accelerate the electrons to a higher energy (e.g., 40 keV), thus resulting in a shorter radiation wavelength. The periodic structure 1410 is placed at a large distance from the cathode 1421, to ensure that the electron beam 1425 propagates at a speed that approximately corresponds to the anode voltage.

Using the FEA 1420 as the apparatus's electron source has various advantages. The first advantage is that the development of silicon FEA has been bolstered by the scalability into VLSI processes. Second, due to better fabrication techniques and scalability with silicon only wafers, silicon FEA are also more promising in terms of density of emitters per unit area. A larger density of emitters can result in a larger output current per unit area (flux). Third, the output power of a silicon FEA can be comparable to that of a Spindt-type emitter (i.e., metallic, usually made of molybdenum). Fourth, some silicon FEAs can be embedded with current limiters into dielectric matrices to achieve long lifetimes (e.g., greater than 100 hours).

In particular, relying on the recent development of reliable, high-output, silicon-only field emitter arrays and the fabrication of small-pitch periodic gratings, the apparatus 1400 can be realized with silicon-only structures. This can result in a tunable, compact, silicon only source, emitting radiation in the near infrared. This apparatus 1400 can also be configured to emit light at other wavelengths (e.g., using any other design described herein). In addition, the perspective of integrating Smith-Purcell radiation sources with pulsed field emitter arrays can facilitate the bunching of free-electrons at the radiation wavelength. The bunching of electrons can achieve more efficient emission, and potentially lasing.

Figure 14C:
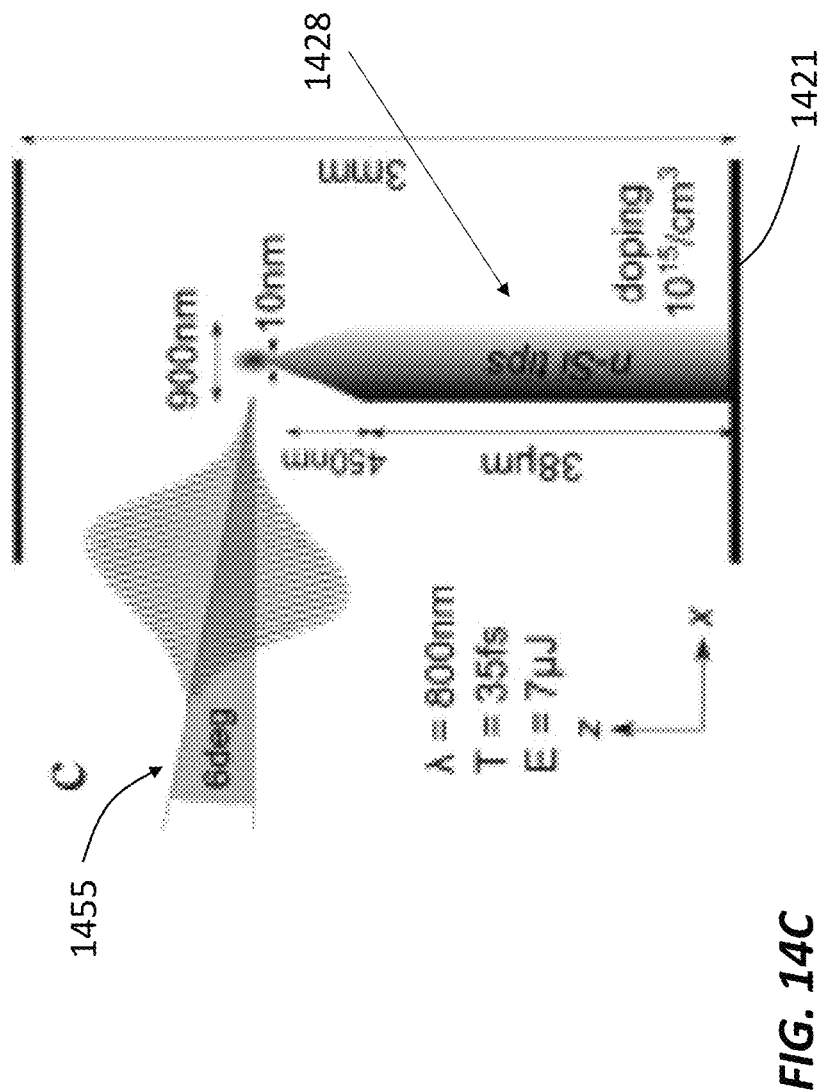
FIG. 14C illustrates optical tunneling process that can be used to generate the electron beam for the apparatus shown in FIGS. 14A and 14B.

FIG. 14C illustrates optical tunneling process that can be used to generate the electron beam 1425 in the apparatus 1400. The laser pulse 1455 is directed to the tip of the emitters 1428. The electrical field in the laser pulse 1455 can be enhanced by the nano-scale tip, thereby inducing electron tunneling. For example, the tip can have a lateral dimension (e.g., diameter) of about 30 nm or less (e.g., about 30 nm, about 20 nm, about 10 nm, about 5 nm, or less, including any values and sub ranges in between). The laser pulse 1455 can have a pulse duration of about 1 ps or less (e.g., about 1 ps, about 500 fs, about 200 fs, about 100 fs, about 50 fs, about 40 fs, about 35 fs, about 30 fs, about 25 fs, about 20 fs, about 15 fs, about 10 fs, about 5 fs, or less, including any values and sub ranges in between).

The laser pulse 1455 can be employed to generate prebunched electron beams, i.e. the electron beam 1425 can include one or more electron bunches. Each electron bunch can have a duration of about 1 ps or less (e.g., about 1 ps, about 500 fs, about 200 fs, about 100 fs, about 50 fs, about 40 fs, about 35 fs, about 30 fs, about 25 fs, about 20 fs, about 15 fs, about 10 fs, about 5 fs, or less, including any values and sub ranges in between). As described herein, a bunched electron beam can increase coherence optical emission (via Smith-Purcell radiation) can therefore increase the conversion efficiency (i.e. from electron energy to optical energy in the emitted light).

Figure 14D:
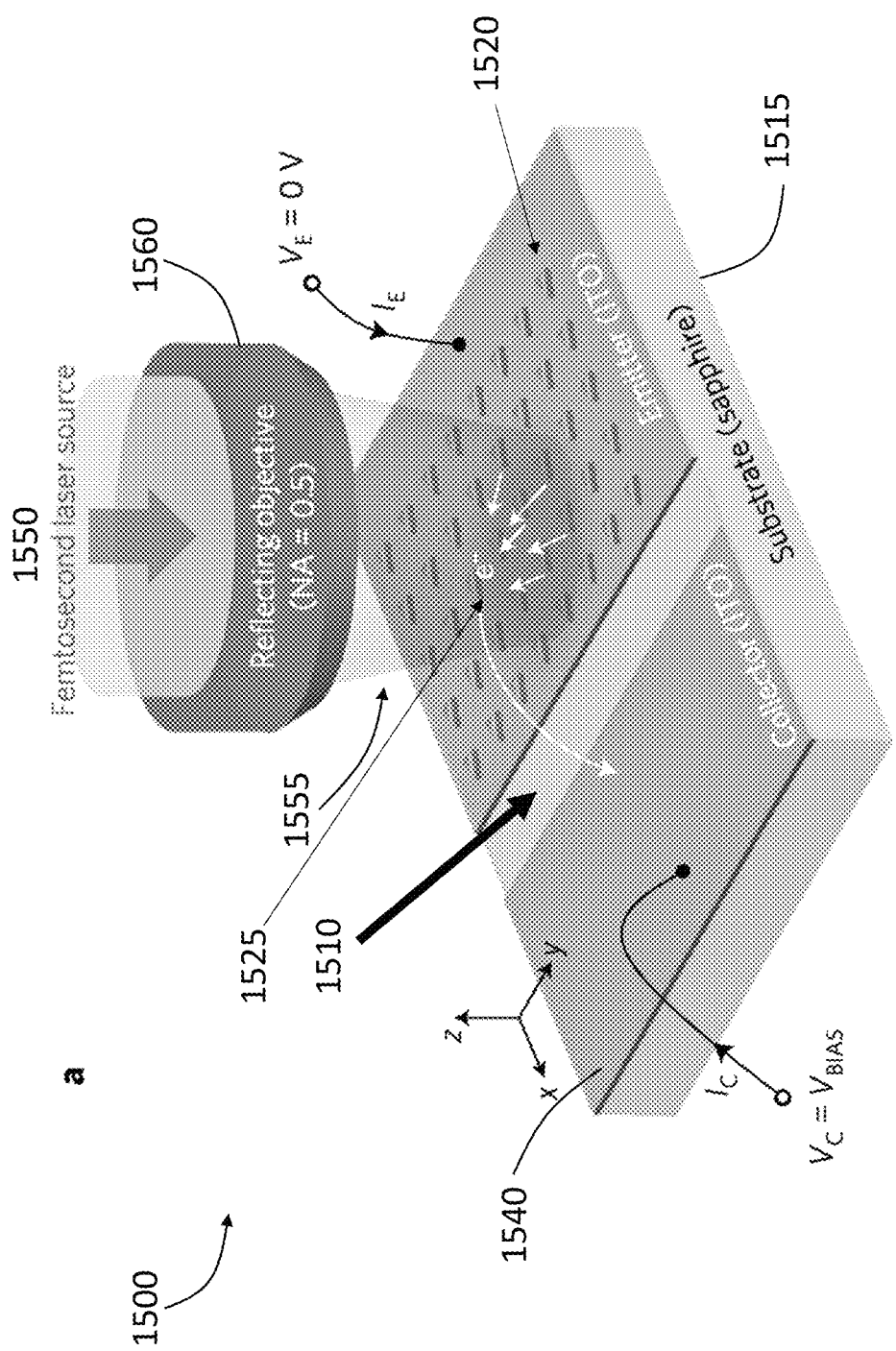
FIG. 14D shows a schematic of a Smith-Purcell radiation source using a field emitter array (FEA) to generate electron beams via optical tunneling.

FIG. 14D shows a schematic of a Smith-Purcell radiation source 1500 using a field emitter array (FEA) 1520 to generate an electron beams 1525 via optical tunneling. The electron beam 1525 propagates above a periodic structure 1510 to induce Smith-Purcell radiation. A collector 1540 is disposed on the other end of the periodic structure 1510 to collect the electron beam 1525. For optical tunneling, a laser 1550 emits a laser pulse 1555, which is focused by an objective 1560 onto the array of emitters so as to generate the electron beam 1525. In one example, the FEA 1520 can include an array of silicon tips. In another example, the FEA 1520 can include an array of gold nanoparticles. In FIG. 14D, the plane of the FEA 1520 is disposed parallel to the place of the periodic structure 1510. The periodic structure 1510, the FEA 1520, and the collector 1540 can be fabricated on a common substrate 1515 (e.g., sapphire substrate).

Figure 14E:
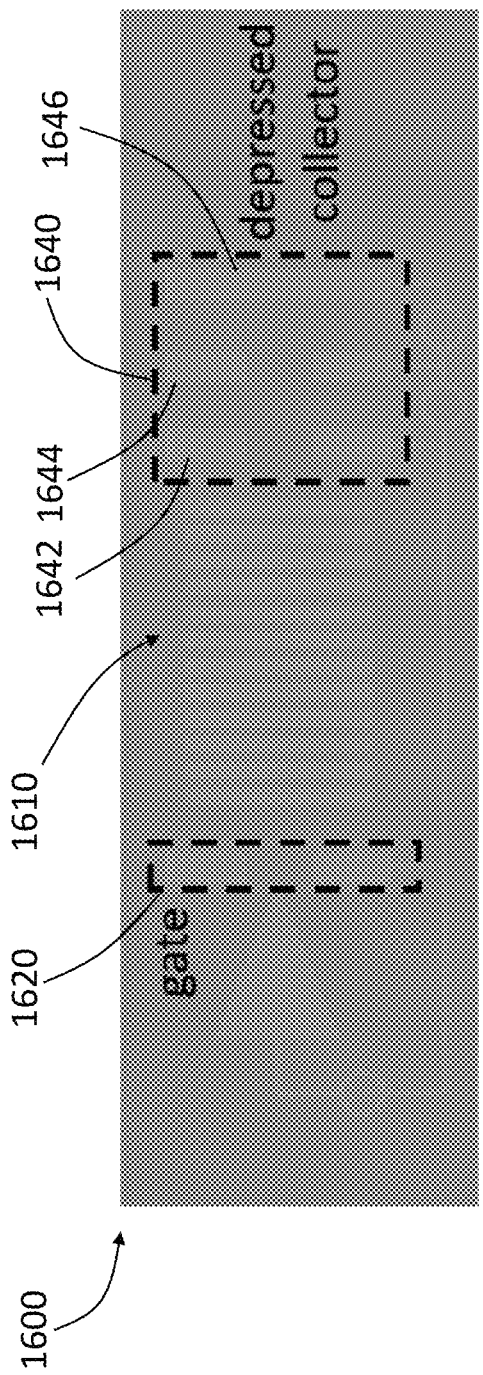
FIG. 14E shows a schematic of a Smith-Purcell radiation source using an FEA to generate electron beams and a depressed collector to recycle kinetic energy of the electron beams.

FIG. 14E shows a schematic of a Smith-Purcell radiation source 1600 using an FEA 1620 to generate electron beams and a depressed collector 1640 to recycle kinetic energy of the electron beams after the electron beams interact with a periodic structure 1610 to generate Smith-Purcell radiation. The depressed collector 1640 includes multiple electrodes 1642, 1644, and 1646 arranged in stages. Each of the electrodes has a negative voltage of increasing potential, such that the first electrode 1642 has the lowest potential and the final electrode 1646 has the greatest potential. During operation, electrons having the lowest axial energy can be collected on the first electrode 1642, while electrons having higher axial energy can travel to the latter electrodes 1644 and 1646 for collection. The energy from the collected electrons is then sent back to the FEA 1620, thereby recycling at least part of the kinetic energy in the electron beams. The recycling efficiency can be about 80% or higher (e.g., about 80%, about 85%, about 90%, about 95%, about 99%, or higher, including any values and sub ranges in between).

Figure 15:
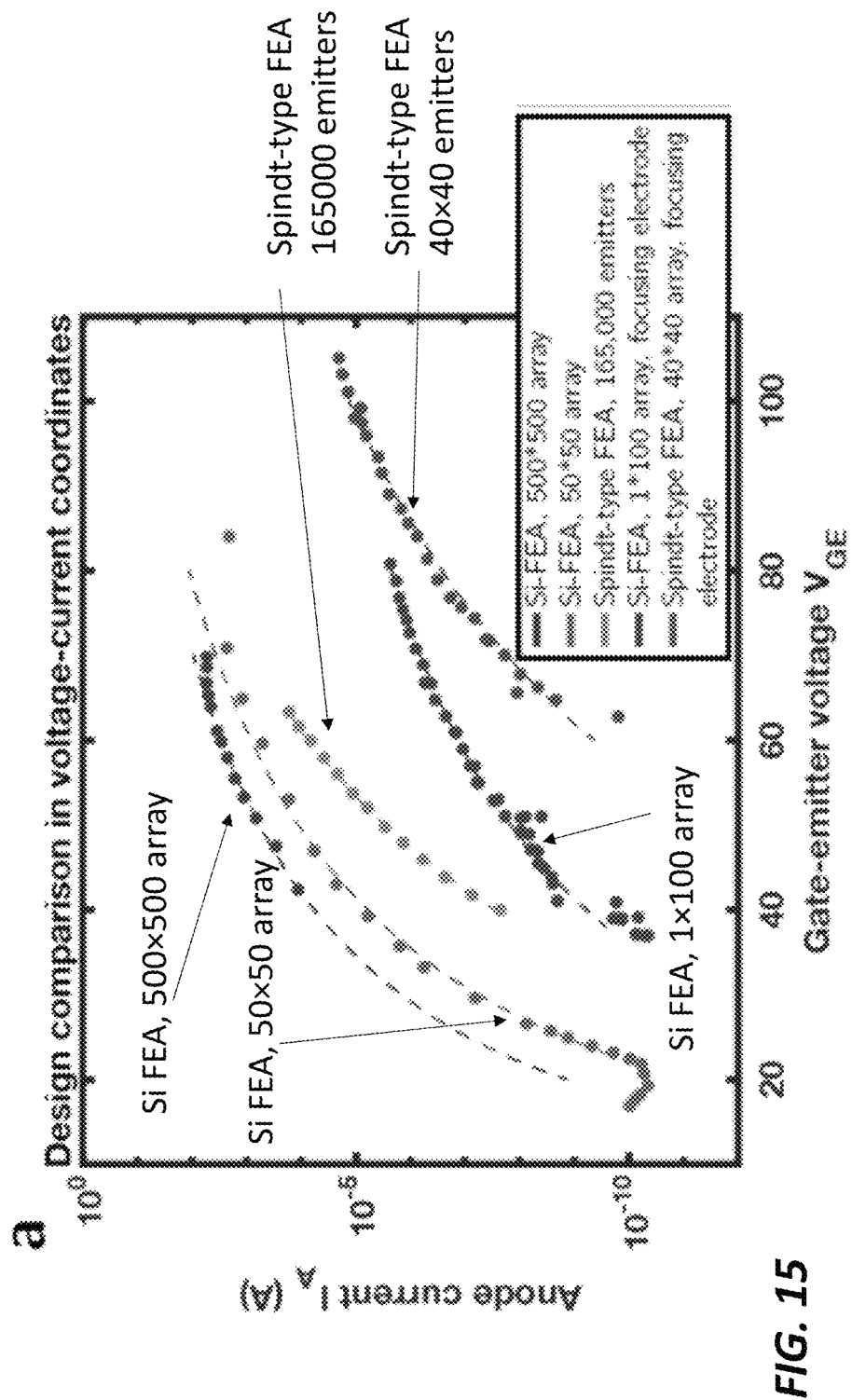
FIG. 15 shows measured anode current as a function of gating voltage on the gating electrode in different types of silicon and metallic FEAs that can be used in the apparatus shown in FIGS. 14A and 14B.

FIG. 15 shows measured anode current as a function of gating voltages on the gating electrode in different types of silicon and metallic FEAs. The FEAs includes a first silicon FEA having an array of 500×500 emitters, a second silicon FEA having an array of 50×50 emitters, a third silicon FEA having an array of 1×100 emitters and a focusing electrode, a first Spindt-type FEA having 165000 emitters, and a second Spindt-type FEA having an array of 40×40 emitters. In general, silicon FEAs can produce a larger anode current at the same gating voltage. In addition, increasing the number of emitters can also increase the anode current.

Figure 16:
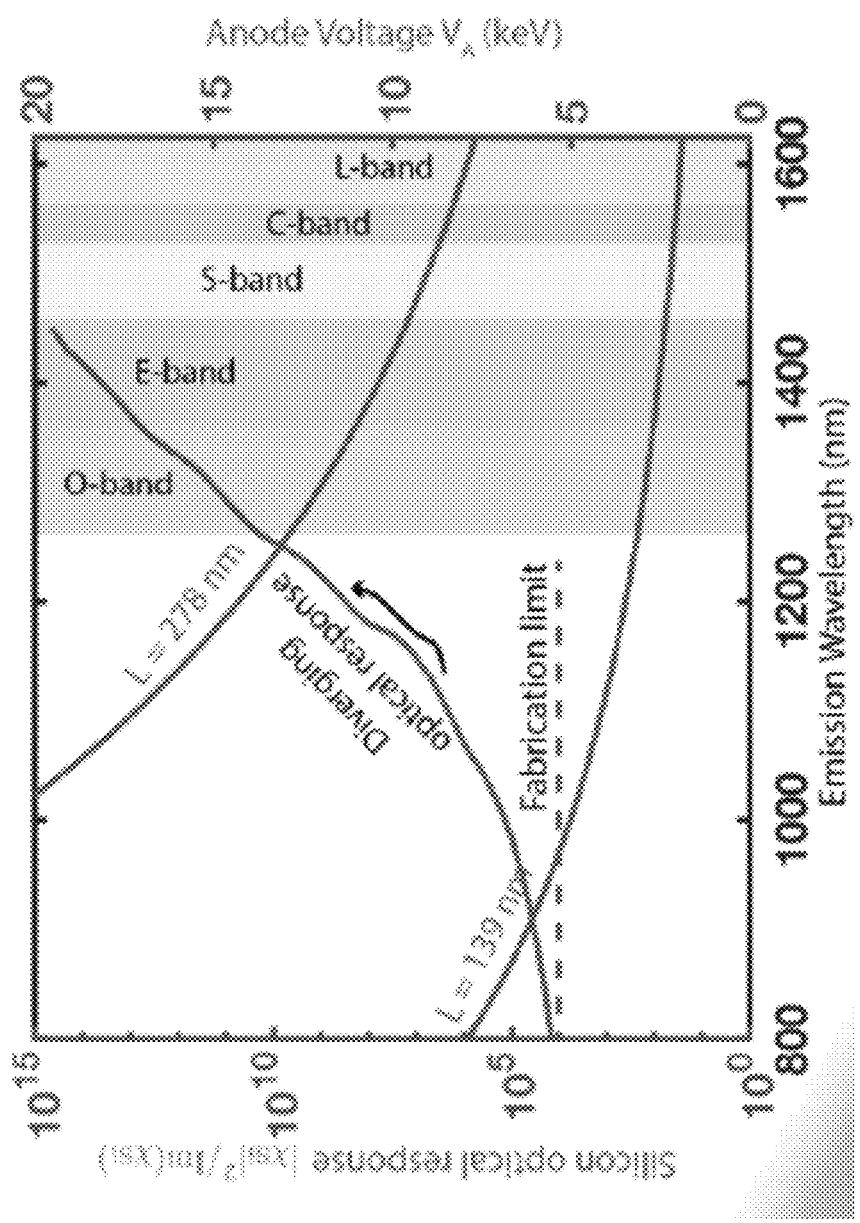
FIG. 16 illustrates the tunability of the apparatus shown in FIG. 14A using two periodic structures having periods of 139 nm and 278 nm, respectively.

FIG. 16 illustrates the tunability of the apparatus 1400 using two periodic structures having periods of 139 nm and 278 nm, respectively. The periodic structure with a period of 139 nm can generate radiation at wavelengths from about 800 nm to about 1600 nm by tuning the electron voltage between about 2 keV and about 7.5 keV. The periodic structure with a period of 278 nm can generate radiation at wavelengths from about 1000 nm to about 1600 nm by tuning the electron voltage between about 7 keV to about 20 keV. In addition, the FOM ($|\chi|^2/\text{Im}\chi$) of the optical response of silicon in the spectral window between 800 nm and 1600 nm generally increases as the wavelength increases, demonstrating efficient radiation emission.

Figure 17:
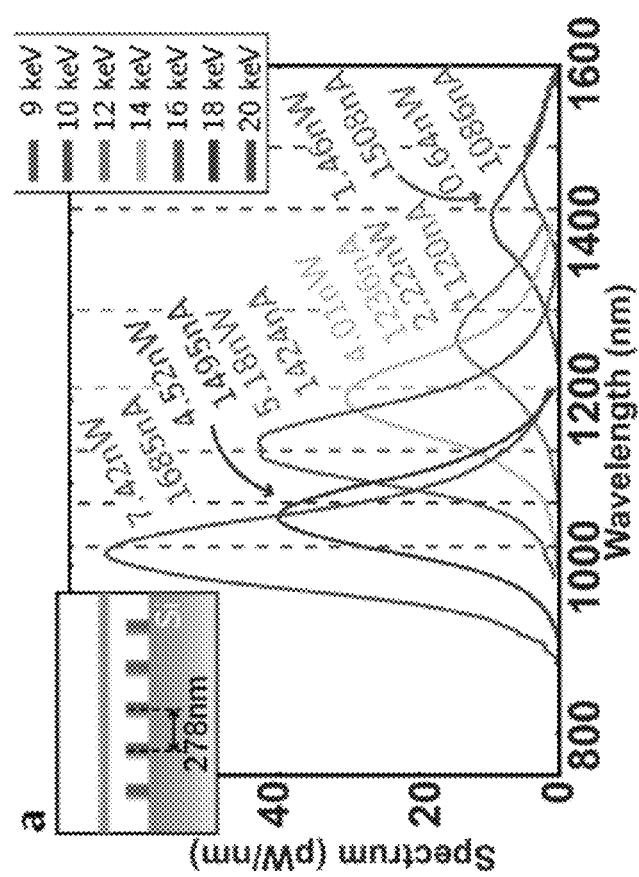
FIG. 17 shows measured spectra of Smith-Purcell radiation generated by the apparatus shown in FIGS. 14A and 14B using a periodic structure having a period of 278 nm.

FIG. 17 shows measured spectra of Smith-Purcell radiation generated by the apparatus 1400 using the periodic structure with a period of 278 nm. The wavelength of the Smith-Purcell radiation increases from about 1000 nm to about 1500 nm as the electron voltage is changed from about 20 keV to about 9 keV.

Figures 18A, 18B:
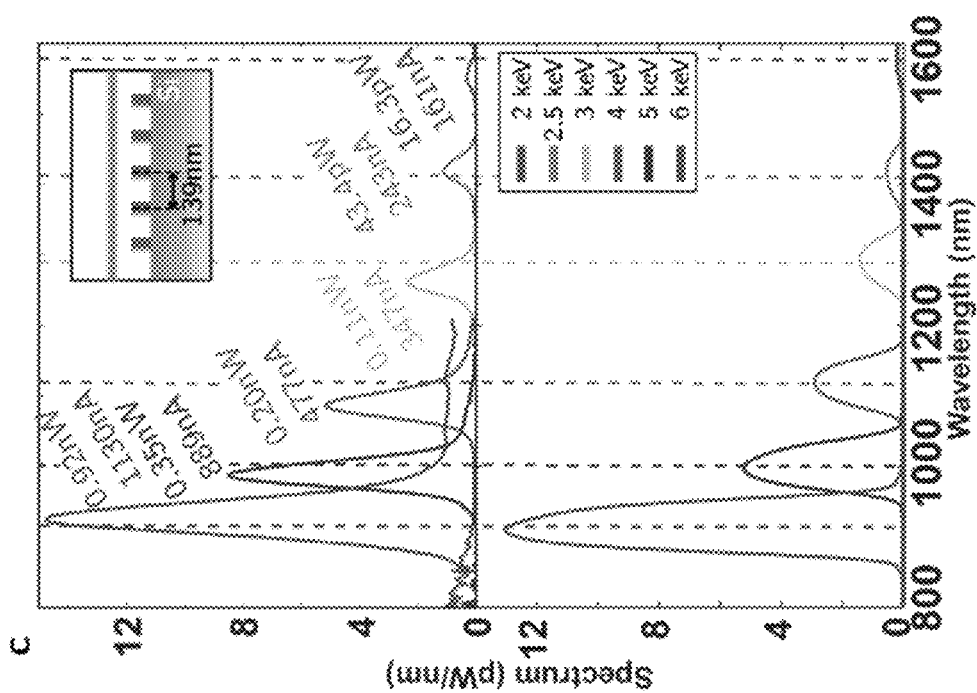
FIGS. 18A and 18B show measured and calculated spectra, respectively, of Smith-Purcell radiation generated by the apparatus shown in FIGS. 14A and 14B using a periodic structure having a period of 139 nm.

FIGS. 18A and 18B show measured and calculated spectra, respectively, of Smith-Purcell radiation generated by the apparatus 1400 using the periodic structure having a period of 139 nm. The wavelength of the Smith-Purcell radiation increases from about 900 nm to about 1600 nm as the electron voltage is changed from about 6 keV to about 2 keV. In addition, the measured spectra (in FIG. 18A) agree well with the calculated spectra (in FIG. 18B).

Figure 19A:
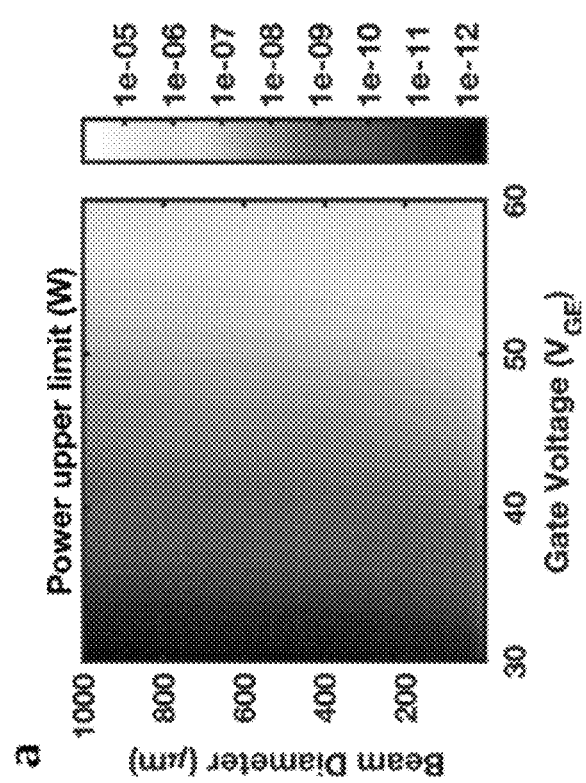
FIG. 19A shows maximum output power from the apparatus shown in FIGS. 14A and 14B as a function of the electron beam diameter and gating voltage.
Figure 19B:
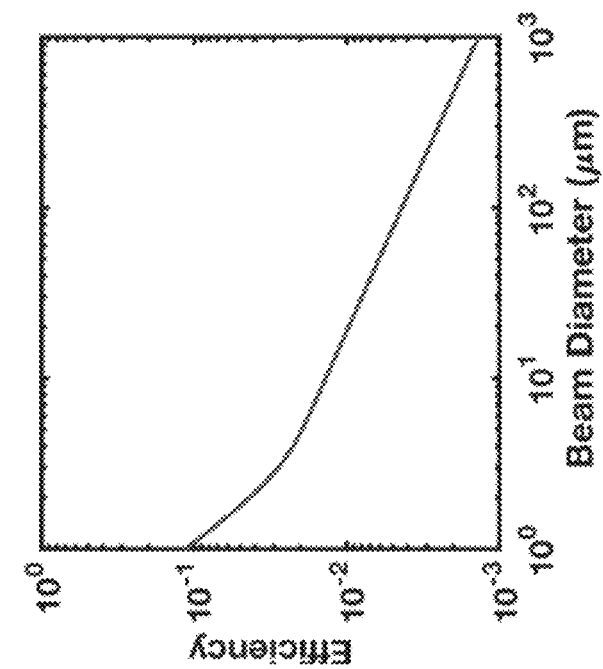
FIG. 19B shows emission efficiency of the apparatus shown in FIGS. 14A and 14B as a function of the electron beam diameter.

FIG. 19A shows maximum output power from the apparatus 1400 as a function of the electron beam diameter and gating voltage. FIG. 19B shows emission efficiency as a function of the electron beam diameter. In general, a smaller diameter of the electron beam 1425 can result in a higher output power and emission efficiency.

Narrow-Band Enhancement of Smith-Purcell Radiation

Equation (6) tends to diverge for lossless materials (i.e., Im$\chi$→0) and suggests a mechanism capable of strongly enhancing Smith-Purcell radiation: by exploiting high-Q resonances near bound states in the continuum (BICs) in photonic crystal slabs, Smith-Purcell radiation can be enhanced by orders of magnitude when specific frequency, phase, and polarization matching conditions are met.

BICs reside inside the continuum but remain perfectly localized with no leakage. In a scattering experiment, waves from infinity can excite the resonances, causing a rapid variation in the phase and amplitude of the scattered waves within a certain spectral linewidth. However, such waves usually do not excite BICs, because BICs are decoupled from the radiating waves and are invisible in this sense. Therefore, a BIC can be considered as a resonance with zero leakage and zero linewidth ($\gamma=0$; or infinite quality factor $Q=\omega_0/2\gamma$). Calculating the BIC of a photonic structure usually involves an eigensolver of Maxwell's equations, i.e., an eigensolution without external source input. This can be done with various numerical tools such as finite-difference-time-domain or finite-element methods.

FIG. 20A shows a schematic of a silicon-on-insulator grating 2000 to illustrate the narrow-band enhancement of Smith-Purcell radiation via high-Q resonance near a photonic BIC. The grating 2000 includes a SiO$_2$ substrate 2015 and a silicon grating 2010 formed on the substrate 2015. The grating 2010 can be treated as a 1D photonic crystal slab that is periodic in the x direction and infinite in they direction. An electron beam 2025 propagates near the surface of the grating 2010 to induce Smith-Purcell radiation.

FIG. 20B shows the calculated TE band structure in the Γ-X direction of the grating 2000. The area shaded in light and dark indicates the light cone of air and silica, respectively. The electron lines (for velocities v and v/2) can phase match with either the guided modes (circles) or high-Q resonances near a BIC (square).

The one-dimensional silicon ($\chi=11.25$)-on-insulator (SiO$_2$, $\chi=1.07$) grating 2000 interacting with a sheet electron beam 2025 shown in FIG. 20A can illustrate narrow-band enhancement of Smith-Purcell radiation. The transverse electric (TE) (Ex, Hy, Ez) band structure (lowest two bands labeled TE0 and TE1), matched polarization for a sheet electron beam, is depicted in FIG. 20B along the Γ-X direction. Folded electron wave vectors, $kv=\omega/v$, are overlaid for two distinct velocities (v and v/2). Strong electron photon interactions can occur when the electron and photon dispersions intersect. For example, kv and the TE0 band intersect below the air light cone (labelled as intersection 1 in FIG. 20B), and kv/2 and the TE0 band can also interact at intersection 2. However, the TE0 band is evanescent in the air region, thereby rendering it challenging to achieve free-space radiation.

To overcome this deficiency, a new mechanism for enhanced Smith-Purcell radiation can be based on coupling of electrons with BICs. BICs have extreme quality factors of guided modes but are embedded in the radiation continuum, ensuring that any resulting Smith-Purcell radiation can be coupled into the far field. By choosing appropriate velocities $\beta$ near $a/m\lambda_B$, where m is a positive integer and $\lambda_B$ is the BIC wavelength, the electron lines can intersect the TE1 mode at the BIC, as illustrated in FIG. 20B. Under this condition, strong enhancements of a guided mode can be achieved in tandem with the radiative coupling of a continuum resonance.

In FIG. 20B, the BIC occurs at Gamma point ($k_x=0$). The dispersion of electrons in the band structure includes folded straight lines. The dispersion can be tailored by the speed of electrons to change the slope of the dispersion. At certain electrons speeds, the electron band and photonic band cross each other at the exact BIC (e.g., upper left corner in FIG. 20B). This meets the frequency and phase matching conditions for the Smith-Purcell radiation enhancement. Since the induced field of a sheet electron beam is a TM field, the TM bands of the grating is considered to achieve the polarization matching.

FIGS. 21A and 21B show calculated incident field of electrons at velocities $\beta$ at $a/\lambda_B$ and $a/2\lambda_B$, respectively, in the grating 2000. FIGS. 21C and 21D show calculated resonant quality factor and eigenmode profile near a BIC, respectively, in the grating 2000. In FIGS. 21A and 21B, the incident fields of electrons and the field profile of the BIC indicate their large modal overlaps. The BIC field profile shows complete confinement without radiation, unlike conventional multipolar radiation modes. The Qs of the resonances are also provided near a symmetry-protected BIC at the Γ point.

Figure 22A:
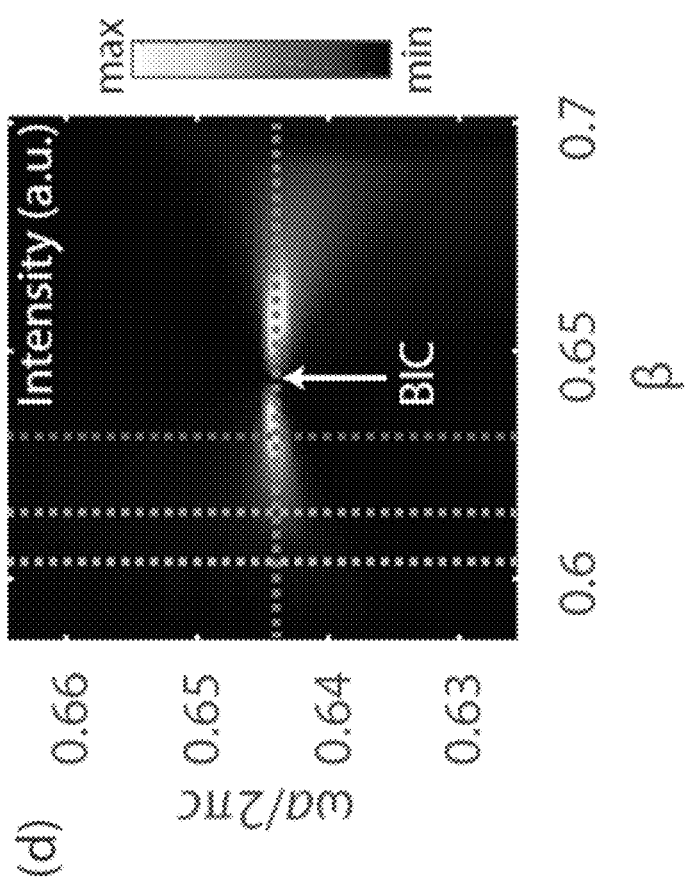
FIG. 22A illustrates the strongly enhanced Smith-Purcell radiation near the BIC in the grating shown in FIG. 20A.
Figure 22C:
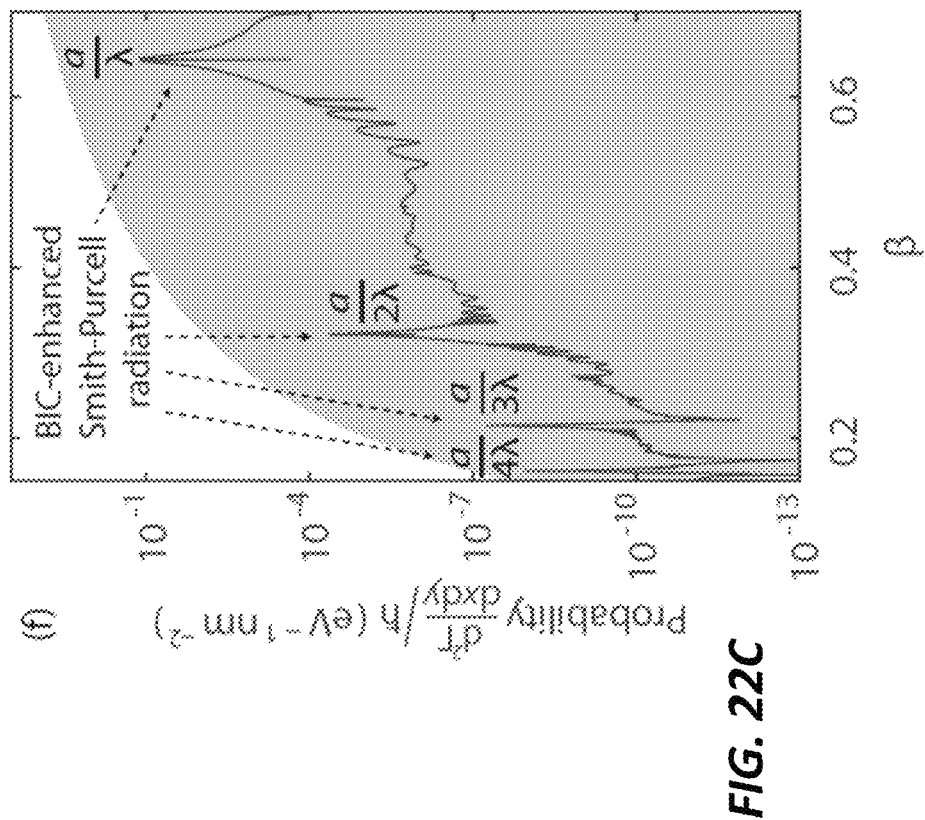
FIG. 22C shows enhancement of Smith-Purcell radiation as a function of electron velocity taking into account material losses.
Figure 22B:
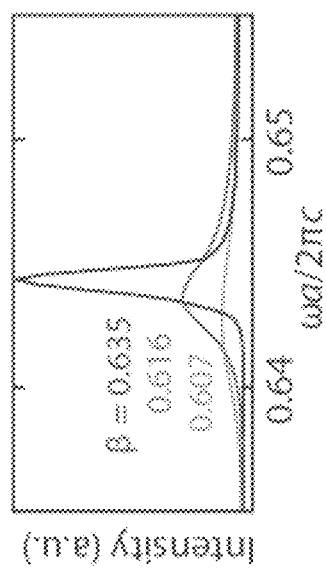
FIG. 22B shows field profiles along the vertical lines in FIG. 22A.

FIG. 22A illustrates strongly enhanced Smith-Purcell radiation near a BIC. FIG. 22B shows field profiles along the vertical lines in FIG. 22A. FIG. 22C shows enhancement of Smith-Purcell radiation as a function of electron velocity taking into account material losses. Strong enhancement happens near electron velocities $\beta=a/m\lambda$ (m=1, 2, 3 . . . ). FIGS. 22A and 22B demonstrate the velocity tunability of BIC-enhanced radiation. Maximum enhancement occurs at a small offset ($\beta$ at about 0.635) from the BIC where the Q-matching condition is satisfied, i.e., the non-resonant Smith-Purcell radiative rate equals the radiative decay rate of the resonance. Practically, silicon has nonzero loss across the visible and near infrared wavelengths. For example, for a period of a=676 nm, the optimally enhanced radiation wavelength is about 1050 nm, at which $\chi_{Si}\sim 11.25+0.001i$.

For an electron-structure separation of about 300 nm, FIG. 22C shows the strong radiation enhancements (greater than 3 orders of magnitude) attainable by BIC-enhanced coupling. The upper limit (shaded region) attains extremely large values due to the low material loss (e.g., $|\chi|^2/\mathrm{Im}\chi$ is about 105). Nevertheless, BIC-enhanced coupling enables the radiation intensity to closely approach this limit at several resonant velocities. FIG. 22C is a line-cut of FIG. 22A at the wavelength of about 1545 nm. The same BIC can be coupled with the fundamental electron velocity v and its fractals (e.g., v/2, v/3, v/4, etc.).

A light source based on the narrow-band enhancement of Smith-Purcell radiation can be similar to any of the apparatus described herein (e.g., apparatus 600 in FIG. 6, apparatus 700 in FIG. 7, apparatus 1400 in FIGS. 14A-14B, 1500 in FIG. 14D, and 1600 in FIG. 14E). The light source includes a periodic structure defining at least one bound state in the continuum (BIC) at a bound state wavelength $\lambda_B$. Such a light source may include an electron source to emit the electron beam having an electron velocity v between about $0.9\times ac/(m\lambda_B)$ and $1.1\times ac/(m\lambda_B)$ so as to achieve the enhancement near the BIC, where a is a period of the periodic structure, c is the speed of light in vacuum, and m is a positive integer. The enhancement can be realized by tuning the electron energy, tuning the geometry of the periodic structure (e.g., during manufacturing), or both.

To construct BICs, the material of the photonic structure can be lossless in the spectral region of interest. For example, in the infrared regime, a silicon-on-insulator platform can be used, as shown in FIGS. 20A and 20B. In the optical regime, lossless oxides and nitrides, such as $Si_3N_4$, $Al_2O_3$, $SiO_2$, $HfO_2$, $TiO_2$, and $MgF_2$, among others, can be used. In addition, from the structural point of view, it can be helpful for the periodic structure to maintain in-plane symmetry (e.g., C2, C4 or C6 symmetry) to generate symmetry-protected BICs. If parametric BICs are used, extra up-down mirror symmetry is also useful.

FIGS. 23A and 23B show schematics of two supercells for narrow-band enhancement of Smith-Purcell radiation. FIG. 23A shows a schematic of a supercell 2301 including multiple rows 2311 disposed periodically along the y direction. Each row 2311 also includes a periodic array of elements 2321 (e.g., spheres, pillars, or any other microstructure or nanostructure known in the art) disposed along the x direction. Therefore, the supercell 2301 has a first period along the y direction and a second period, different from the first period, along the x direction. An electron 2331 propagates along the x direction in the supercell 2301, which emits Smith-Purcell radiation having at least one component in the z direction (out of the plane of the page). FIG. 23B shows a schematic of a supercell 2302 including an array of structures 2312a, 2312b, and 2312c disposed periodically along the y direction. Each structure 2312a/b/c can be substantially the same as the supercell 2301 shown in FIG. 23A. In this supercell 2302, electron 2332 propagates along the x direction, photonic BICs occur in the y direction, and the Smith-Purcell radiation propagates in the z direction.

In the supercells 2301 and 2302, the electrons and Smith-Purcell photons experience different periods. Therefore, the supercells 2301 and 2302 decouple the periodicity "experienced" by electrons (i.e., the period that causes Smith-Purcell radiation) from the periodicity "experienced" by photons (i.e., the period that creates bandgap, BIC, etc.). The smaller period (e.g., along the x direction) diffracts the induced field of electrons into the continuum and the larger period (e.g., along the y direction) enhances the radiation via exotic photonic effects. Strong Smith-Purcell radiation can be achieved with such a design with slow and nonrelativistic electrons.

Broadband Enhancement of Smith-Purcell Radiation

The enhancement of Smith-Purcell via BICs is narrow-band enhancement. In contrast, broadband enhancement of Smith-Purcell radiation can be realized by coupling electrons with non-Hermitian-perturbed Dirac cone (i.e., linear dispersion near exceptional points). In other words, for broadband enhancement, canonical linear dispersion can be constructed in photonic crystals. If the dispersion of electrons overlaps with the edge of a Dirac cone, Smith-Purcell radiation can be enhanced over a broadband range.

FIGS. 24A-24F illustrate construction of Dirac cones in photonic crystals that can be used for broadband enhancement of Smith-Purcell radiation. FIG. 24A illustrates a Hermitian system and FIG. 24D shows the corresponding band structures. Dirac dispersion can be constructed in two-dimensional photonic crystals via accidental degeneracy (FIG. 24A, inset), where a square lattice (periodicity a) of circular air holes (radius r) is introduced in a dielectric substrate. This is a Hermitian system, as there is no material gain or loss and no open boundary for radiation. By tuning a system parameter (e.g., r), one can achieve accidental degeneracy between a quadrupole mode and two degenerate dipole modes at the Γ point (i.e., center of the Brillouin zone), leading to a linear Dirac dispersion due to the anti-crossing between two bands with the same symmetry.

FIGS. 24B and 24C show the real part and imaginary part, respectively, of eigenvalues of an open and non-Hermitian system, in which the photonic crystal slab has a finite thickness h. FIGS. 24E and 24F show the band structure corresponding to FIGS. 24B and 24C, respectively. With the open boundary, modes within the radiation continuum become resonant because they radiate by coupling to extended plane waves in the surrounding medium. Non-Hermitian perturbations are usually included in the Hamiltonian to account for the radiation loss. Here, a ring of exceptional points with coalesced eigenvalues defined by $|k|=k_c$ separates the k space into two regions: inside the ring (i.e., $|k|<k_c$), Re(k) is dispersionless and degenerate, while outside the ring ($|k|>k_c$), Im(k) is dispersionless and degenerate. In the vicinity of $k_c$, Im(k) and Re(k) exhibit square-root dispersion (also known as branching behavior) inside and outside the ring, respectively. More information about Dirac cones can be found in Bo Zhen, et al., Spawning rings of exceptional points out of Dirac cones, *Nature*, volume 525, pages 354-358, (2015), which is hereby incorporated herein by reference in its entirety.

Figure 25:
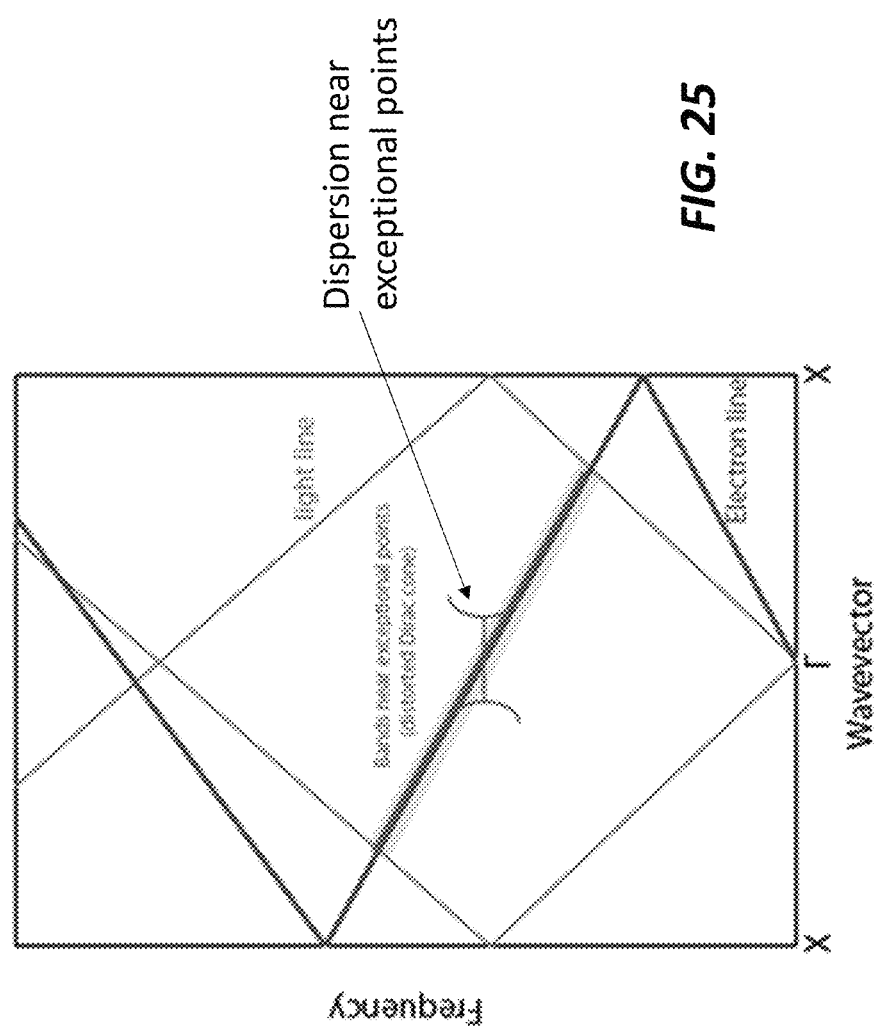
FIG. 25 illustrates broadband enhancement of Smith-Purcell radiation via a distorted Dirac cone.

FIG. 25 illustrates broadband enhancement of Smith-Purcell radiation via a distorted Dirac cone. The typical dispersion near exceptional points is illustrated in the middle of FIG. 25. The dispersions become linear outside the exceptional points. Therefore, the electrons can be set at a specific speed such that the electron dispersion line and the photonic bands (labelled as light line) overlaps for an entire Smith-Purcell order (highlighted region). The bandwidth of enhancement is av/c, where a is the period, v is the electron velocity, and c is the speed of light. It can be up to hundreds of nanometers in the optical regime. This approach can be especially useful for strong optical pulse generation because of the rich frequency component in the pulse.

A light source based on the broadband enhancement of Smith-Purcell radiation can be similar to any of the apparatus described herein (e.g., apparatus 600 in FIG. 6, apparatus 700 in FIG. 7, apparatus 1400 in FIGS. 14A-14B, 1500 in FIG. 14D, and 1600 in FIG. 14E). The light source includes a two-dimensional (2D) photonic crystal characterized by a first dispersion line and the electron beam is characterized by a second dispersion line overlapping with at least a portion of the first dispersion line. The extent of the overlapping defines the bandwidth of the enhancement, i.e., BW=av/c, where a is a period of the periodic structure, v is a speed of the electron beam, and c is the speed of light. The bandwidth can be, for example, substantially equal to or greater than 100 nm (e.g., about 100 nm, about 150 nm, about 200 nm, about 300 nm, about 500 nm, or greater, including any values and sub ranges in between).

Supercollimation of Smith-Purcell Radiation

Electrons can also be coupled with bands of photonic crystals that possess the property of supercollimation. This approach can be helpful for enhancing the directionality of Smith-Purcell radiation. The conventional Smith-Purcell radiation formula predicts that radiation at different wavelengths is usually diffracted into different directions (i.e., polar angles). However, supercollimation in photonic crystals can help increase the density of states that electrons can couples to, thereby rendering the Smith-Purcell radiation stronger and more monochromatic.

Without being bound by any particular theory or mode of operation, a line electron propagating the x direction in free space can be expressed as:

$$J(t)=qv\delta(x-vt)\delta(y)\delta(z) \qquad (37)$$

Therefore, only the $k_x$ component is fixed as $k_x=\omega/v$, while there is usually no restriction on the transverse wave vector $k_y$.

Figure 26:
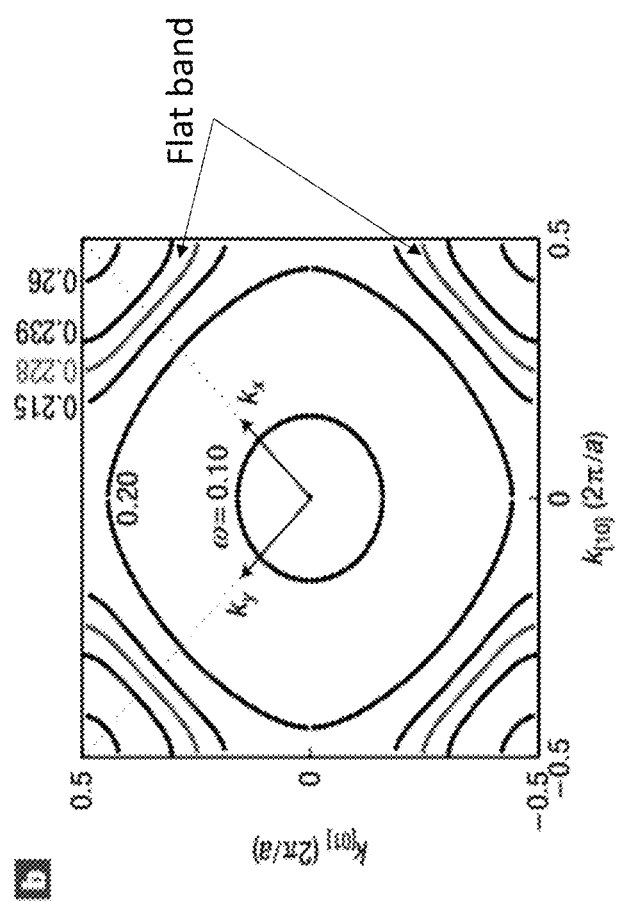
FIG. 26 illustrates supercollimation of photonic crystals for directional and monochromatic Smith-Purcell radiation.

FIG. 26 illustrates the band structure of a photonic crystal that exhibits supercollimation for directional and monochromatic Smith-Purcell radiation. It is usually possible to construct photonic crystals such that at a specific frequency, one mode is matched with the electron dispersion (e.g., the BIC enhancement and the Dirac-like band enhancement). In supercollimation, Smith-Purcell radiation at a specific frequency can be enhanced by modes that span a wide range of wave vectors ($k_x$, $k_y$). As illustrated in FIG. 26, the supercollimaton can be realized by creating flat bands (i.e., very small variation in frequency versus wave vector) in photonic band structures (labelled in FIG. 26). Such a flat band can interact strongly with electrons by phase matching electrons and photonic modes, i.e., the overlapping between a flat band and electron dispersion surface.

A light source based on the broadband enhancement of Smith-Purcell radiation can be similar to any of the apparatus described herein (e.g., apparatus 600 in FIG. 6, apparatus 700 in FIG. 7, apparatus 1400 in FIGS. 14A-14B, 1500 in FIG. 14D, and 1600 in FIG. 14E). The light source includes a photonic crystal defining at least one flat band in the band structure. An electron beam can be created to have a dispersion line overlapping with the flat band so as to achieve broadband enhancement. The flat band usually includes multiple frequency components that have substantially the same wave vector (and accordingly the same propagation direction). Therefore, these frequency components can be enhanced and diffracted towards substantially the same direction, thereby realizing supercollimation.

Enhancement of Smith-Purcell Radiation With 3D Photonic Crystals

Figure 27:
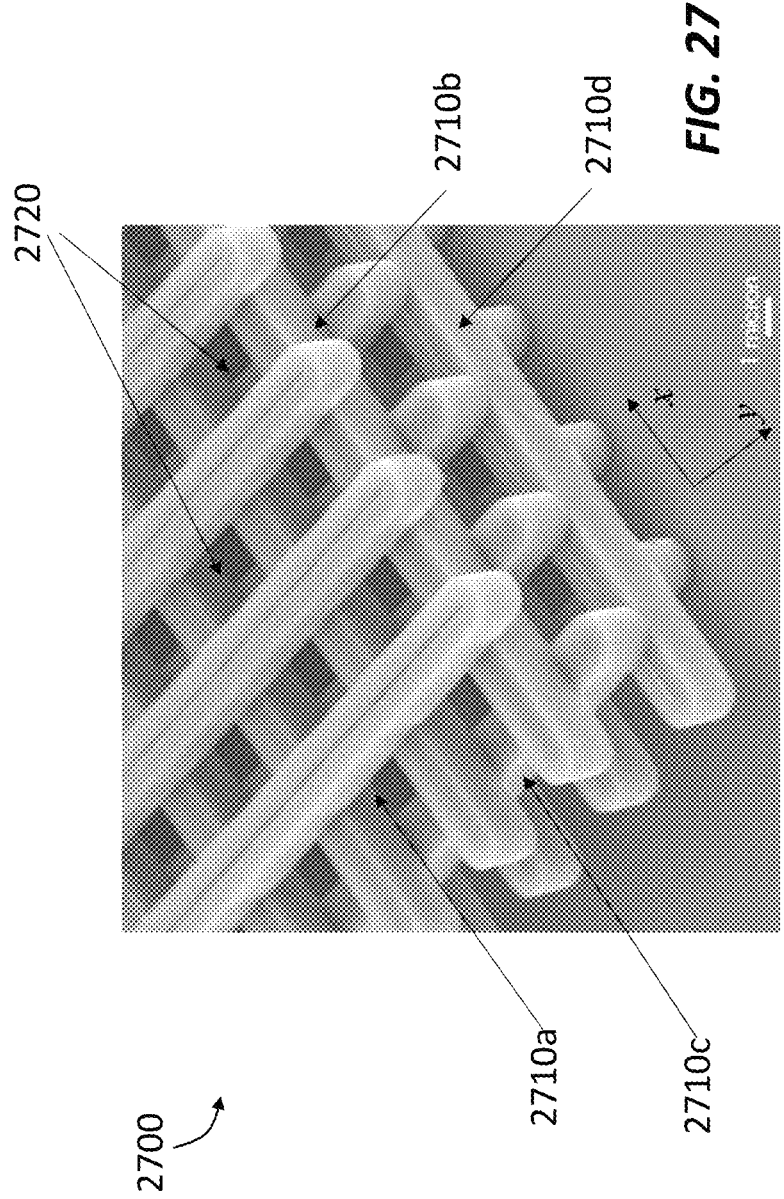
FIG. 27 is an image of a woodpile photonic crystal that can be used for enhancing Smith-Purcell radiation.

The enhancement of Smith-Purcell radiation can also be realized via 3D photonic crystals, which allow for unique control of the coupling with electrons by specifying explicit wave vectors in space. FIG. 27 is an image of a woodpile photonic crystal 2700 that can be used for enhancing Smith-Purcell radiation. The photonic crystal 2700 includes multiple layers of strips 2710a, 2710b, 2710c, and 2710d (only four layers are labelled but many more layers can be included). Adjacent layers of strips have periodicity along different and perpendicular directions. For example, the first layer 2710a and the third layer 2710c include multiple strips (e.g., made of either metals or dielectrics) disposed periodically along the x direction, while the second layer 2710b and the fourth layer 2710d include multiple strips disposed along the y direction. This configuration creates air holes 2720 in the photonic crystal 2700 that can be used as the pathway for electrons to efficiently couple with specific desired modes of the photonic crystal 2700. The coupling, in turn, can enhance the Smith-Purcell radiation in a specific direction. The periodic design of the three-dimensional crystal can be versatile. In one example, the photonic crystal 2700 can have a uniform period within the entire structure. In another example, the photonic crystal 2700 can include supercells having different periods along different directions. For example, smaller periods can be used for slow electrons to radiate and larger periods can be used for exotic modes to outcouple the emitted photons.

Improved Mode Overlapping of Electron Induced Field With Photonic Modes

The induced field of electrons are usually cylindrically symmetric along the electron trajectory, while the optical Bloch modes are in-plane extended. Therefore, the field overlapping between the two is often limited. To address this issue, the periodic structure or the electron beam profile can be tailored to increase the overlapping.

Figure 28:
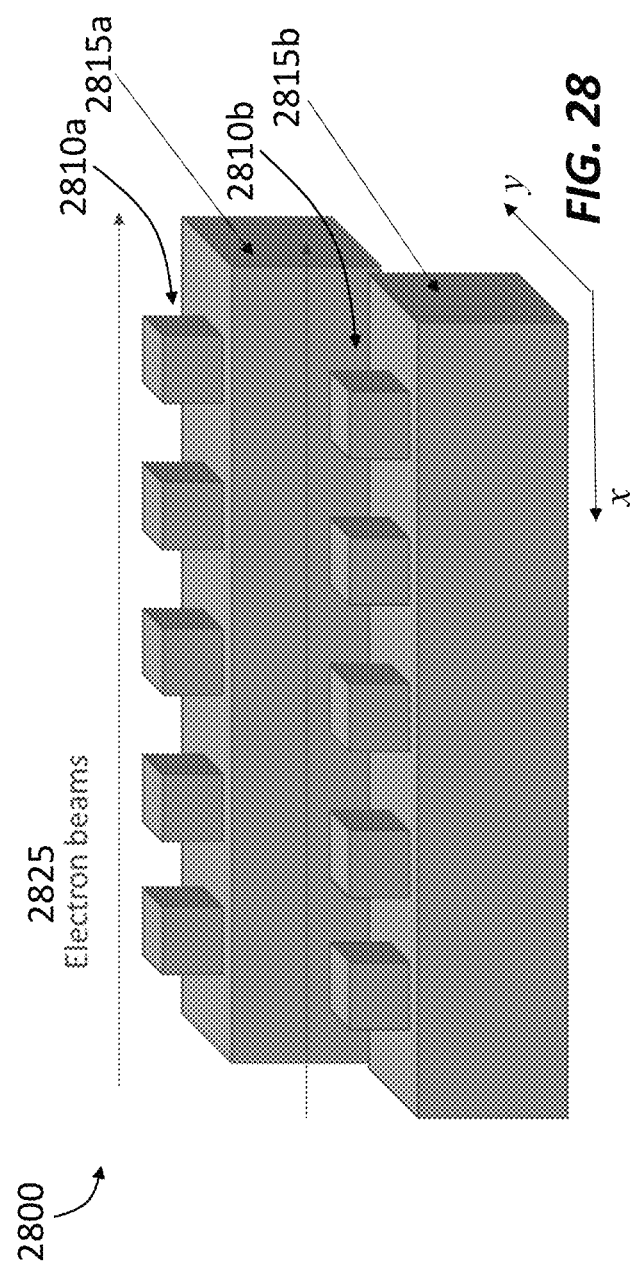
FIG. 28 shows a schematic of a periodic structure including corrugated waveguides to increase the overlapping between electron-induced field and photonic modes.
Figure 29:
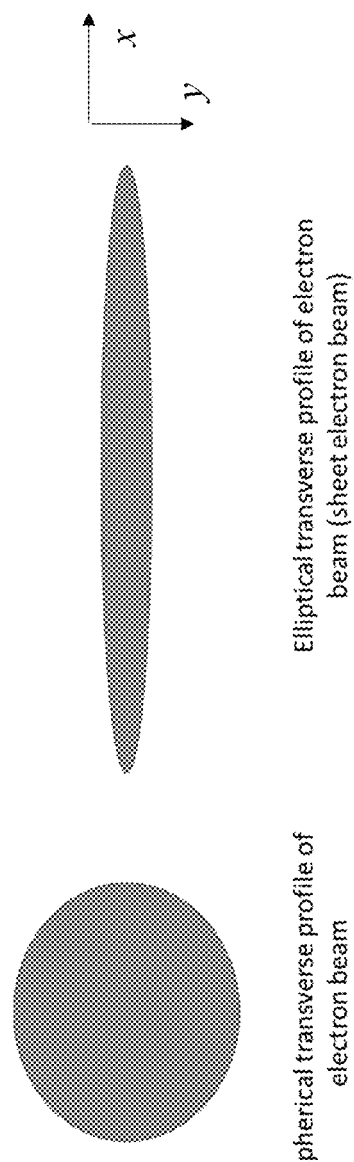
FIGS. 29A and 29B illustrate electron beam profiles that can be used for enhancing Smith-Purcell radiation.

FIG. 28 shows a schematic of a periodic structure 2800 including corrugated waveguides to increase the overlapping between electron-induced field and photonic modes. The periodic structure 2800 includes an array of optical waveguides 2815a and 2815b (more can be included and disposed along the direction perpendicular to the electron beam propagation, i.e., y direction). Multiple corrugations 2810a and 2810b (e.g., nano-pillars) are disposed periodically on the waveguides 2815a and 2815b, respectively. The electron beam 2825 propagates along the corrugations 2810a and 2810b to induce Smith-Purcell radiation.

The optical mode in the periodic structure 2800 can be guided in the transverse direction (i.e., the y direction in FIG. 28) to greatly enhance the electron-mode interaction. In one example, the waveguides 2815a and 2815b can be separated by at least several wavelengths of the Smith-Purcell radiation, in which case electron beam 2825 can propagate above one waveguide (e.g., 2815a) without interacting with the adjacent waveguides (e.g., 2815b). In another example, the two waveguides 2815a and 2815b can be close each other (e.g., with subwavelength separation) to form a 2D photonic crystal. In one example, the period along the x direction can be the same as the period along the y direction. In another example, the period along the x direction can be different from the period along the y direction to form a supercell, e.g., as in FIG. 23B.

FIGS. 29A and 29B illustrate spherical and elliptical electron beam profiles, respectively. Shaping the spherical electron beam profile into an elliptical (sheet electron) beam profile can significantly improve the interaction, as the induced field of electrons can become pure transverse magnetic fields that couple more efficiently with the transverse magnetic eigenmodes of the structures. The elliptical beam shown in FIG. 29B has a major axis along the x direction and propagates along the y direction.

Rate Equations for Free Electron Lasers and Stimulated Smith-Purcell Radiation

The upper limit demonstrated herein (e.g., Equations (6), 7(a), and 7(b)) is in the spontaneous emission regime for constant-velocity electrons and can be extended to the stimulated regime by suitable reformulation. Stronger electron-photon interactions can change electron velocity by a non-negligible amount that alters the radiation. This correction can be perturbatively incorporated. In the case of external optical pumping, the upper limit can be revised by redefining the incident field as the summation of the electron incident field and the external optical field. From a quantum mechanical perspective, this treatment corresponds to stimulated emission from free electrons, which multiplies the limit by the number of photons in that radiation mode. This treatment can also potentially translate the upper limit into a fundamental limit for particle acceleration, which is the time-reversal of free electron energy loss and which typically incorporates intense laser pumping. In the multi-electron scenario, the radiation upper limit can be obtained in the case of perfect bunching, where all electrons radiate in phase. In this case, single-electron limit can be multiplied by the number of electrons to correct for the superradiant nature of such coherent radiation.

Stimulated emission and lasing can be described quantitatively by rate equations in conventional systems. For example, the rate equations for the inversion D and photon number n are as follows:

$$dD/dt = (1/T)(D_0 - D) - 2WDn \quad (38)$$

$$\frac{dn}{dt} = WDn - 2\kappa n \quad (39)$$

where T is the timescale of relaxation of the inversion towards equilibrium, W is the coupling constant (equal to the rate of emission in a single atom scenario) and κ is the cavity photon decay rate. $D_0$ is the inversion resulting only from pump and relaxation processes, in the absence of lasing processes.

The main goal of analysis here is to adapt the rate equations to the case of a free electron laser (FEL) based on undulators or Smith-Purcell (SP) radiation. Simulations where the modes near a BIC interact with the electron beam and the equations for electron motion in the case of a perpendicular periodic magnetic field (as in undulators) or longitudinal periodic electric field (as in the near BIC mode case) suggest that the physics of undulators is similar to the physics of Smith-Purcell radiation.

Adapting the rate equations to a FEL case involves finding the new physical meaning of all quantities in atomic laser rate equations. The photon number plays the same role in both cases. However, physically justifying the new role of the other variables tends to be more complex.

The inversion in an atomic laser is defined as the (normalized) difference between the atoms in the excited state (i.e., gain medium entities that can emit photons) and ground state (i.e., states that can absorb). In FEL theory, what determines whether an electron (gain medium entity) is emitting or absorbing is its phase relative to the light field, also referred to as the ponderomotive phase. Intuitively, the average over all electrons gives the analogue of the atomic inversion (i.e., average of atomic excitation). The average reflects the electron/atom dynamics, but only in a collective/averaged way. For further justification, it turns out that the standard 1D FEL equations are given in terms of photon number and collective variables (e.g., bunching factor and energy deviation). When the energy distribution of the incoming beam is uniform, the bunching factor can be defined as:

$$B = (1/N_e)\Sigma \exp[i\psi_n] \quad (40)$$

The threshold for an atomic laser is given in terms of the minimal pumped inversion $D_{0T}$ for the lasing process to start, given by the rate equations as: $D_{0T} = 2\kappa/W$. If there is no pumping at the beginning, the threshold is not reached, so lasing does not start. In the free electron case, this threshold can be translated as the threshold in the characteristics of the incoming electron beam. Lasing may not be achieved (assuming no photons and energy deviation are present) if the electrons in the incoming beam are perfectly uniformly distributed, i.e., $B_0 = 0$. The prebunching usually is over a certain threshold value to trigger free electron lasing. Thresholds in experimental papers are given in electron current values, which does not have an analogue in the atomic case. However, the bunching noise in the incoming beam (one of its Fourier components resulting in prebunching at the needed frequency) is dependent on the current. It is a Schottky noise, which gives a Rayleigh density distribution of bunching as:

$$\langle |B| \rangle = \sqrt{\pi N_e} \quad (41)$$

Equation (41) can provide the relation between the threshold in prebunching factor and threshold in current.

The coupling constant W in the atomic case is given as the rate of photon emission by a single atom. Assuming the same meaning here, taking it from Comsol simulations through $N_{ext}(\omega')$ (per electron per frequency per period) and translate it to (per unit time):

$$W = \left(\frac{a}{\beta c}\right)^{-1} \int N_{ext}(\omega')d\omega' \approx \beta\left(\frac{c}{a}\right)N_{ext}(\omega)(\beta\omega) = \beta^2\left(\frac{c}{a}\right)\omega N_{ext}(\omega) \quad (42)$$

The frequency width is given by:

$$\lambda = a(1/\beta - \cos(\theta)), \Delta\omega = \beta\omega. \quad (43)$$

For the decay rate of the "cavity", one take the inverse time for the electron to go through the whole structure:

$$\kappa = \left(\frac{L}{\beta c}\right)^{-1} = \frac{1}{N}\beta\frac{c}{a}, \quad (44)$$

where N is the total number of periods in the structure. The timescale for the bunching factor to reach the equilibrium state could be of the order of time through one period $\tau \sim (1/\beta)(a\backslash c)$, but is not need it for the threshold anyway.

By taking all of this into account, the threshold current is given in a closed form as $$I_{th} = e\frac{4c}{\pi a\beta N^2\omega^2 N_{ext}^2(\omega)}, \quad (45)$$

which is about 10e-5 A (within an order of magnitude).

A more straight-forward approach for obtaining the order of magnitude of the threshold can be obtained by using the Comsol result $N_{ext}(\omega')$ and only the second of the two rate equations, in addition to assuming full inversion (i.e., all gain medium entities are in excited state). In this case, no interpretation of the other rate equation variable is needed, except for the photon number, coupling, and decay constants. By evaluating W in the same way as above and κ from the resonance quality factor, one arrives at the result:

$$I_t = e/(\beta Q\, N_{ext}(\omega)) \quad (46)$$

if the photonic crystal resonance is broader than the Smith-Purcell natural width $\beta\omega$, or a result completely independent of the quality factor.

$$I_t = e/N_{ext}(\omega) \quad (47)$$

if the resonance is narrower.

The rate equation formalism can in principle be generalized to a two-photon emission scenario. By comparing the results of the rate equation approach to two-photon atomic lasers above to the standard results obtained by the more complicated quantum treatment, one can show that the simpler approach is nevertheless valid. In the two-photon case, the rate equations are given as $$\dot{D} = (D_0 - D)/T - 2WDn^2$$

$$\dot{n} = 2WDn^2 - 2\kappa n \quad (48)$$

for a degenerate two-photon emission.

$$\dot{D}(D_0 - D)/T - 2WDn_1 n_2$$

$$\dot{n}_1 = WDn_1 n_2 - 2\kappa n_1$$

$$\dot{n}_2 = WDn_1 n_2 - 2\kappa n_2 \quad (49)$$

for a more general one.

Applications of Smith-Purcell Radiation

Smith-Purcell Radiation Generation at THz Regime

Microwaves (radiation whose frequency is less than 0.1 THz) and infrared radiation (greater than 20 THz) are widely used in modern technology, due to the combination of high technical performance and mass-produced solid-state microelectronics. Caught in between, however, the THz spectrum has yet to be used in a mature solid-state device.

The techniques for generating and enhancing Smith-Purcell radiation described herein can provide the opportunity for efficient THz source. In the THz regime, the relative fabrication error of the micro- or nano-structure is lower since the dimensions of the structure are larger. Plenty of lossless or low-loss dielectrics or metals (i.e., behaving like perfect conductors) can be used to construct these structures. Since the material and fabrication requirements are relaxed (compared to light sources in optical regime), the exotic photonic effect can be fully explored to build efficient spontaneous or stimulated SP radiation source at the THz regime.

UV, EUV, and Soft X-Ray Applications of Smith-Purcell Sources

As described above, the Smith-Purcell effect can be used to realize efficient sources in the UV, EUV, and x-ray regimes. According to Equation (1), with nonrelativistic electrons (e.g., $\beta<0.3$), Smith-Purcell radiation can be in the UV regime via at least three different approaches. The first approach includes reducing the pitch of the periodic structure (e.g., on the order to 10 nm). This small pitch can be fabricated using, for example, reflective optics made of silicon and molybdenum. The second approach includes generating higher-order radiation using, for example, structures having a very high aspect ratio. For example, the second order, third order, or even higher-order of radiation can be generated and collected. The third approach includes shaping the angular efficiency to efficiently emit at incidence close to the direction of propagation of the electron beam (i.e., $\theta=0$). This can be achieved by phase-matching the Smith-Purcell radiation at the desired angle with a surface plasmon. The estimated spectral power and angular distribution can be estimated with frequency-domain (COMSOL) and time-domain (FDTD Lumerical) simulations.

Figure 30:
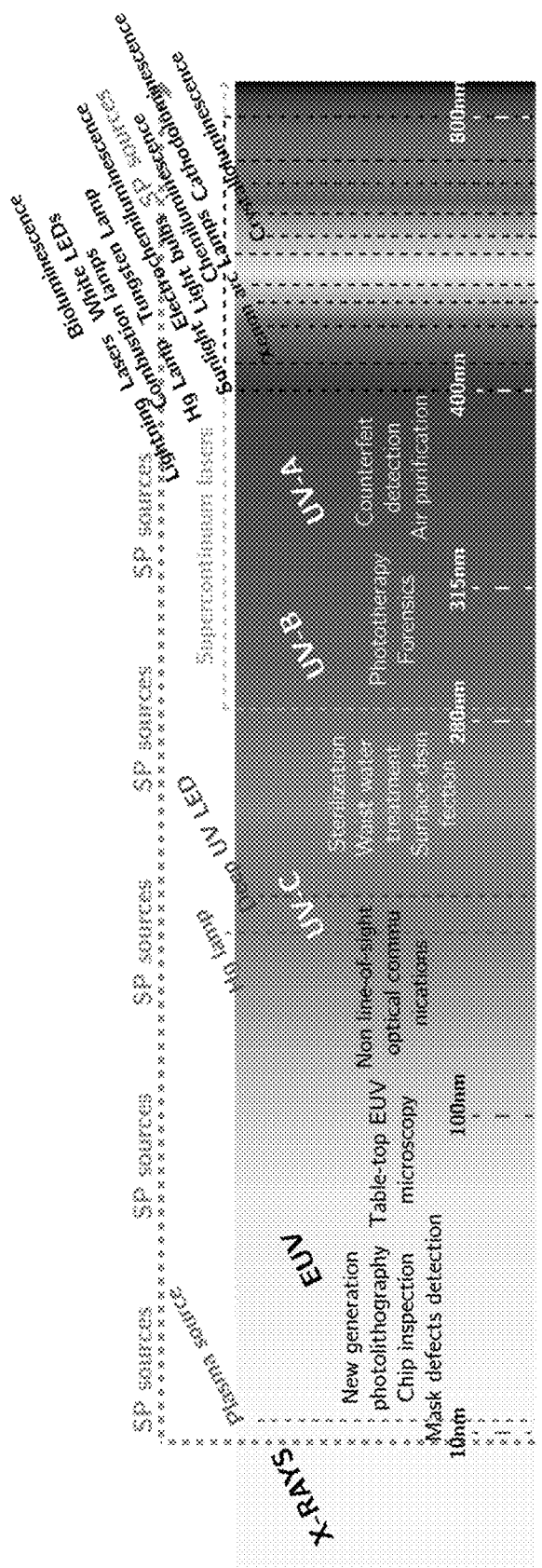
FIG. 30 illustrates state-of-the-art sources in the ultra-violet and extreme ultra-violet regime and the range of output wavelengths of Smith-Purcell radiation.

FIG. 30 illustrates state-of-the-art sources in the UV/EUV regime and the range of output wavelength of Smith-Purcell radiation. FIG. 30 also shows various applications of Smith-Purcell sources, including lithography, EUV microscopy, non-line-of-sight optical communications, sterilization and waste water treatment, phototherapy, counterfeit detection, and air purification.

In lithography, plasma sources are usually the first choice to provide radiation in the EUV regime. However, the risk of mask and wafer contamination can be very high. Smith-Purcell sources can address these challenges, because they can produce a powerful emission line at 13.5 nm using materials (e.g., silicon and molybdenum) that are usually used to build reflective optics at the lithography wavelengths. In addition, molding the flow of light (described below) can reduce the number of focusing optics, thereby reducing the power level used in lithography.

Several techniques can be used to achieve optical power from Smith-Purcell sources that is comparable with state-of-the-art plasma sources. For example, the electron beam current can be increased by orders of magnitude (e.g., to several mA) so as to increase the output power. In another example, the electron beams can be emitted in a pulsed mode, which can be employed to achieve bunching and lasing (e.g., superradiant regime) so as to increase the output power. In yet another example, narrowband enhancement techniques as described herein can be used.

FIG. 31 shows a table comparing existing UV/EUV light sources with Smith-Purcell light sources. Smith-Purcell sources usually have superior tunability in the center wavelength and bandwidth compared to the current solutions in this range. For example, the center wavelength can be readily adjusted by changing the velocity of the electron beam. Smith-Purcell sources can also offer a compact platform, such as a real table-top device.

Smith-Purcell sources can also provide a promising platform for metrology. With the capability to emit light at short wavelengths (e.g., down to tens of nm), these light sources are especially suitable for the inspection of the new generation of EUV lithography masks. This application also uses much less power compared to that used in lithography.

Molding the Flow of Light in the UV/EUV

Several approaches can be employed to mold light flow in the UV/EUV regime. For example, the molding can include, for example, generation of arbitrary phase profiles that can implement any optical function including focusing, defocusing, and collimation. In another example, the molding can include the generation of arbitrary states of polarization of light and arbitrary phase profiles. In yet another example, the molding can include generation of light with arbitrary Orbital Angular Momentum (OAM).

The molding of light flow can be achieved using patterned gratings that gradually change their period in space (pseudo-periodic). Another approach is to design resonances to couple the electric and magnetic dipoles in order to generate arbitrary states of polarization. A free-electron exciting resonances in these structures can emit Smith-Purcell radiation in a particular state of polarization. Arranging these resonators to impart phase retardances between linear polarizations can generate arbitrary elliptical phase profiles. One advantage of this approach is that it can be used to mold the flow of light in the UV/DUV regime, where regular optics absorb radiation in this regime and inefficient diffractive optics (zone plates) or reflective optics are usually used.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for generating Smith-Purcell radiation having a spectral component at a wavelength λ, the apparatus comprising:
   a periodic structure comprising a dielectric material; and
   an electron source, in electromagnetic communication with the periodic structure, to emit an electron beam propagating within about 5λ from a surface of the periodic structure to induce emission of the Smith-Purcell radiation, the electron beam having an electron energy tunable between about 0.5 keV and about 40 keV so as to change the wavelength of the Smith-Purcell radiation,
   wherein the electron source comprises a gated field emitter array (FEA).

2. The apparatus of claim 1, wherein the periodic structure comprises a silicon grating having a periodicity along a first direction and the electron source is configured to emit the electron beam in the first direction.

3. The apparatus of claim 1, wherein the periodic structure defines at least one bound state in the continuum (BIC) at a bound state wavelength $\lambda_B$ and the electron source is configured to emit the electron beam having an electron velocity v between about $0.9 \times ac/(m\lambda_B)$ and $1.1 \times ac/(m\lambda_B)$, where a is a period of the periodic structure, c is the speed of light in vacuum, and m is a positive integer.

4. The apparatus of claim 3, wherein the periodic structure is characterized by an in-plane symmetry.

5. The apparatus of claim 1, wherein the periodic structure has a period of about 50 nm to about 300 nm, the electron energy is substantially equal to or less than 2 keV, and the wavelength of the Smith-Purcell radiation is about 300 nm to about 1600 nm.

6. The apparatus of claim 1, wherein the periodic structure comprises a corrugated optical waveguide.

7. The apparatus of claim 1, wherein the periodic structure and the gated FEA are fabricated in a semiconductor substrate.

8. The apparatus of claim 1, further comprising:
   a laser, in optical communication with the FEA, to illuminate the FEA with a light pulse so as to generate the electron beam comprising at least one electron bunch having a duration substantially equal to or less than 1 ps.

9. The apparatus of claim 1, further comprising:
   a depressed collector, operably coupled to the FEA, to receive the electron beam and recycle at least a portion of kinetic energy of the electron beam.

10. The apparatus of claim 1, wherein a grazing angle of the electron beam with respect to the surface of the periodic structure is substantially equal to or less than 5°.

11. The apparatus of claim 1, wherein the electron source is configured to emit the electron beam with an elliptical beam profile having a major axis perpendicular to a propagation direction of the electron beam.

12. An apparatus for generating Smith-Purcell radiation having a spectral component at a wavelength $\lambda$, the apparatus comprising:
   a periodic structure comprising a dielectric material; and
   an electron source, in electromagnetic communication with the periodic structure, to emit an electron beam propagating within about $5\lambda$ from a surface of the periodic structure to induce emission of the Smith-Purcell radiation, the electron beam having an electron energy tunable between about 0.5 keV and about 40 keV so as to change the wavelength of the Smith-Purcell radiation,
   wherein the periodic structure comprises a two-dimensional (2D) photonic crystal characterized by a first dispersion line and the electron beam is characterized by a second dispersion line overlapping with at least a portion of the first dispersion line so as to generate the Smith-Purcell radiation with a bandwidth BW=av/c, where a is a period of the periodic structure, v is a speed of the electron beam, and c is the speed of light.

13. The apparatus of claim 12, wherein the bandwidth of the Smith-Purcell radiation is substantially equal to or greater than 100 nm.

14. An apparatus for generating Smith-Purcell radiation having a spectral component at a wavelength $\lambda$, the apparatus comprising:
   a periodic structure comprising a dielectric material, and
   an electron source, in electromagnetic communication with the periodic structure, to emit an electron beam propagating within about $5\lambda$ from a surface of the periodic structure to induce emission of the Smith-Purcell radiation, the electron beam having an electron energy tunable between about 0.5 keV and about 40 keV so as to change the wavelength of the Smith-Purcell radiation,
   wherein the periodic structure comprises a two-dimensional (2D) photonic crystal characterized by a photonic band structure having a flat band and the electron beam is characterized by a dispersion line overlapping with at least a portion of the flat band so as to generate supercollimation.

15. A method for generating Smith-Purcell radiation having a spectral component at a wavelength $\lambda$, the method comprising:
   generating an electron beam using a gated field emitter array (FEA) fabricated in a semiconductor substrate;
   propagating the electron beam within about $5\lambda$ from a surface of a periodic structure comprising a dielectric material and fabricated in the semiconductor substrate, the electron beam inducing emission of the Smith-Purcell radiation; and
   changing an electron energy of the electron beam between about 0.5 keV and about 40 keV to change a wavelength of the Smith-Purcell radiation.

16. The method of claim 15, wherein emitting the electron beam comprises propagating the electron beam along a first direction and the periodic structure comprises a silicon grating having a periodicity along the first direction.

17. The method of claim 15, wherein the periodic structure defines at least one bound state in the continuum (BIC) at a bound state wavelength $\lambda_B$ and emitting the electron beam comprises propagating the electron beam with an electron velocity v between about $0.9 \times ac/(m\lambda_B)$ and $1.1 \times ac/(m\lambda_B)$, where a is a period of the periodic structure, c is the speed of light in the vacuum, and m is a positive integer.

18. The method of claim 15, wherein the periodic structure has a period of about 100 nm to about 300 nm, the electron energy is substantially equal to or less than 2 keV, and the wavelength of the Smith-Purcell radiation is about 400 nm to about 1500 nm.

19. The method of claim 15, wherein emitting the electron beam comprises propagating the electron beam near the surface of a corrugated optical waveguide.

20. The method of claim 15, further comprising:
   illuminating the FEA with a light pulse so as to generate the electron beam with at least one electron bunch having a duration substantially equal to or less than 1 ps.

21. The method of claim 15, further comprising:
   receiving the electron beam; and
   recycling at least a portion of kinetic energy of the electron beam using a depressed collector.

22. The method of claim 15, wherein emitting the electron beam comprises propagating the electron beam at a grazing angle substantially equal to or less than 5° with respect to the surface of the periodic structure.

23. The method of claim 15, wherein emitting the electron beam comprises emitting the electron beam with an elliptical beam profile having a major axis perpendicular a propagation direction of the electron beam.

24. A method for generating Smith-Purcell radiation having a spectral component at a wavelength $\lambda$, the method comprising:
   emitting an electron beam to propagate within about $5\lambda$ from a surface of a periodic structure comprising a dielectric material, the electron beam inducing emission of the Smith-Purcell radiation; and
   changing an electron energy of the electron beam between about 0.5 keV and about 40 keV to change a wavelength of the Smith-Purcell radiation,
   wherein emitting the electron beam comprises propagating the electron beam near the surface of a two-dimensional (2D) photonic crystal characterized by a first dispersion line, and the electron beam is characterized by a second dispersion line overlapping with at least a portion of the first dispersion line so as to generate the Smith-Purcell radiation having a bandwidth BW =av/c, where a is a period of the periodic structure, v is a speed of the electron beam, and c is speed of light.

25. The method of claim 24, wherein the bandwidth of the electromagnetic radiation is substantially equal to or greater than 100 nm.

26. A method for generating Smith-Purcell radiation having a spectral component at a wavelength $\lambda$, the method comprising:
   emitting an electron beam to propagate within about $5\lambda$ from a surface of a periodic structure comprising a dielectric material, the electron beam inducing emission of the Smith-Purcell radiation; and
   changing an electron energy of the electron beam between about 0.5 keV and about 40 keV to change a wavelength of the Smith-Purcell radiation,
   wherein the periodic structure comprises a two-dimensional (2D) photonic crystal characterized by a photonic band structure having a flat band and the electron beam is characterized by a dispersion line overlapping with at least a portion of the flat band so as to generate supercollimation.

27. A tunable light source, comprising:

a periodic structure comprising a dielectric material and fabricated in a semiconductor substrate, the periodic structure defining at least one bound state in the continuum (BIC) at a bound state wavelength $\lambda_B$; and a gated field emitter array (FEA) fabricated in the semiconductor substrate and configured to emit an electron beam propagating within about 50 nm of a surface of the periodic structure to induce Smith-Purcell radiation, the electron beam having an electron velocity v between about $0.9 \times ac/(m\lambda_B)$ and $1.1 \times ac/(m\lambda_B)$, where a is a period of the periodic structure, c is a speed of light, and m is a positive integer.

* * * * *